United States Patent
Zhang et al.

(10) Patent No.: US 12,476,758 B2
(45) Date of Patent: Nov. 18, 2025

(54) SIGNAL SENDING METHOD, SIGNAL DETECTION METHOD, AND APPARATUS

(71) Applicant: HUAWEI TECHNOLOGIES CO., LTD., Shenzhen (CN)

(72) Inventors: Di Zhang, Shenzhen (CN); Mingxin Gong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 18/304,528

(22) Filed: Apr. 21, 2023

(65) Prior Publication Data

US 2023/0261827 A1  Aug. 17, 2023

Related U.S. Application Data

(63) Continuation of application No. PCT/CN2020/123442, filed on Oct. 23, 2020.

(51) Int. Cl.
*H04L 5/00* (2006.01)
*H04L 27/26* (2006.01)

(52) U.S. Cl.
CPC ........ *H04L 5/0048* (2013.01); *H04L 27/2601* (2013.01)

(58) Field of Classification Search
CPC ..... H04L 5/0048; H04L 5/005; H04L 5/0051; H04L 27/2601; H04L 27/2602;
(Continued)

(56) References Cited

U.S. PATENT DOCUMENTS

| | | |
|---|---|---|
| 2012/0014320 A1 | 1/2012 | Nam et al. |
| 2015/0155995 A1 | 6/2015 | Papasakellariou et al. |

(Continued)

FOREIGN PATENT DOCUMENTS

| | | |
|---|---|---|
| CN | 105119639 A | 12/2015 |
| CN | 108631976 A | 10/2018 |

(Continued)

OTHER PUBLICATIONS

HTC, "UL SRS enhancement for CoMP," 3GPP TSG-RAN WG1 #69, Prague, Czech Republic, May 21-25, 2012, R1-122327; 2 total pages.

(Continued)

*Primary Examiner* — Khanh C Tran
(74) *Attorney, Agent, or Firm* — Rimon PC

(57) ABSTRACT

A signal sending method, a signal detection method, and an apparatus are disclosed. In the signal sending, a sequence of a reference signal is generated first, where the cyclic shift value of the sequence is determined based on a first parameter and a second parameter, the first parameter is a value from 0 to Q−1, the second parameter is a value from 0 to Z−1, Z and Q are positive integers, and Z is not equal to Q. The reference signal is then sent based on the sequence. According to the method, a difference between the cyclic shift values used by any two terminal devices to determine the sequences of reference signals can be randomized. Further, interference between reference signals generated by using the cyclic shift values obtained by terminal devices according to the method disclosed here can be reduced, the interference can be randomized, and the channel time-domain filtering performance can be improved.

20 Claims, 3 Drawing Sheets

(58) Field of Classification Search
CPC .......... H04L 27/26025; H04L 27/2603; H04L 27/261; H04L 27/2613; H04L 27/26134; H04L 27/26136; H04L 5/0053; H04L 5/0055; H04L 5/0057
See application file for complete search history.

(56) References Cited

U.S. PATENT DOCUMENTS

2015/0270939 A1* 9/2015 Ro .................... H04L 27/2613
370/329
2020/0022127 A1* 1/2020 Li ........................ H04W 72/20

FOREIGN PATENT DOCUMENTS

| WO | 2018018628 A1 | 2/2018 |
| WO | 2020088462 A1 | 5/2020 |

OTHER PUBLICATIONS

Huawei et al., "Short PUCCH for UCI of up to 2 bits," R1-1715399, 3GPP TSG RAN WG1 Meeting AH_NR#3, Nagoya, Japan, Sep. 18-21, 2017; 17 pages.

Huawei et al., "Enhancements on SRS for Rel-17," R1-2005247, 3GPP TSG RAN WG1 Meeting #102-e, E-meeting, Aug. 17-28, 2020; 8 pages.

* cited by examiner

SIGNAL SENDING METHOD, SIGNAL DETECTION METHOD, AND APPARATUS

CROSS-REFERENCE TO RELATED APPLICATIONS

This application is a continuation of International Application No. PCT/CN2020/123442, filed on Oct. 23, 2020, the disclosure of which is hereby incorporated by reference in its entirety.

TECHNICAL FIELD

This application relates to the field of wireless communication technologies, and in particular, to a signal sending method, a signal detection method, and an apparatus.

BACKGROUND

In a system such as a long term evolution (LTE) system or a new radio (NR) system, a sequence of an uplink reference signal such as an uplink demodulation reference signal (DMRS) or an uplink sounding reference signal (sounding reference signal, SRS) is a sequence generated based on a base sequence. The base sequence may be a sequence generated based on a ZC (Zadoff-Chu) sequence, for example, is the ZC sequence or a sequence generated by performing a cyclic shift on the ZC sequence.

For a same base sequence, different reference signals may be obtained by using different cyclic shift values. In a same cell, a base station may allocate different cyclic shift values to different terminal devices, to ensure orthogonality between reference signals sent by different terminal devices. In this way, there is no interference between the reference signals sent by the different terminal devices. However, for different base sequences, regardless of whether two terminal devices are in a same cell or not, neither interference between reference signals obtained by using a same cyclic shift value nor interference between reference signals obtained by using different cyclic shift values is 0. In other words, when different terminal devices in a same cell or different terminal devices in an identical cell send, on a same time-frequency resource, reference signals obtained based on different base sequences, the reference signals always interfere with each other.

SUMMARY

Implementations of this application are intended to provide a signal sending method, a signal detection method, and an apparatus, to reduce interference between reference signals sent by different terminal devices.

According to a first aspect, this application provides a reference signal transmission method. The method is performed by a terminal device or a module in the terminal device. An example in which the method is performed by the terminal device is used herein for description. The method includes: generating a sequence of a reference signal, where a cyclic shift value of the sequence is determined based on a first parameter and a second parameter, the first parameter is a value from 0 to Q−1, the second parameter is a value from 0 to Z−1, Z and Q are positive integers, and Z is not equal to Q; and sending the reference signal based on the sequence.

The cyclic shift value of the sequence is determined based on the first parameter and the second parameter. According to the method, a difference between cyclic shift values used by any two terminal devices to determine reference signals can be randomized. Further, interference between the reference signals generated by using cyclic shift values obtained by terminal devices according to the method can be reduced, the interference can be randomized, and the channel time-domain filtering performance can be improved.

According to a second aspect, this application provides a reference signal transmission method. The method is performed by a network device or a module in the network device. An example in which the method is performed by the network device is used herein for description. The method includes: generating a sequence of a reference signal, where a cyclic shift value of the sequence is determined based on a first parameter and a second parameter, the first parameter is a value from 0 to Q−1, the second parameter is a value from 0 to Z−1, Z and Q are positive integers, and Z is not equal to Q; and performing signal detection based on the sequence.

Based on the foregoing first aspect or second aspect, the following possible implementations are further provided:

In a possible implementation, Q is greater than Z.

In a possible implementation, the first parameter is determined based on a pseudo-random sequence, and the pseudo-random sequence is determined based on the attribute information of the reference signal.

In a possible implementation, the attribute information includes a sequence identifier; or the sequence is generated based on a ZC sequence, and the attribute information includes a root index of the ZC sequence.

In a possible implementation, the cyclic shift value α satisfies the following formula:

$$\alpha = \frac{2\pi \cdot t_1}{Q}(\theta_1) + \frac{2\pi \cdot t_2}{Z}(\theta_2), \text{ or } \alpha = \left(\frac{2\pi}{Q}(\theta_1) + \frac{2\pi}{Z}(\theta_2)\right) \bmod 2\pi,$$

where $\theta_1$ is the first parameter and $\theta_2$ is the second parameter; and $t_1$ is a first coefficient, $t_2$ is a second coefficient; and neither the first coefficient nor the second coefficient is equal to 0.

In a possible implementation, the first parameter $\theta_1$ satisfies the following formula:

$\theta_1 = n_{cs}(n_{s,f}^\mu, l) \bmod Q$, where $n_{cs}(n_{s,f}^\mu, l) = \Sigma_{m=0}^{T-1} 2^m c(TN_{symb}^{slot} n_{s,f}^\mu + Tl + m)$, and m=0, 1, 2, ..., T−1; $n_{s,f}^\mu$ is a slot number, in a system frame, of a slot that the reference signal is in; $N_{symb}^{slot}$ is a quantity of orthogonal frequency division multiplexing OFDM symbols in a slot; l is a symbol number, in the slot, of a symbol that the reference signal is in, $0 \leq l \leq N_{symb}^{slot} - 1$, and that l=0 corresponds to a $1^{st}$ symbol in the slot; T is a positive integer; c(•) is the pseudo-random sequence; and mod is a modulo operation.

According to the foregoing method, cyclic shift values of sequences of reference signals sent by terminal devices in a same system frame can be randomized, so that the interference, in the same system frame, between any two terminal devices that determine reference signals using different ZC sequences can be randomized. In this way, time-domain filtering performance for the reference signal is improved, and channel estimation accuracy is improved.

In a possible implementation, the first parameter $\theta_1$ satisfies the following formula:

$\theta_1 = n_{cs}(n_S) \bmod Q$, where $n_{cs}(n_S) = \sum_{m=0}^{T-1} 2^m c(Tn_S + m)$ and m=0, 1, 2, ..., T−1; $n_S$ is a count value of a reference signal counter; T is a positive integer; c(•) is the pseudo-random sequence; and mod is a modulo operation.

According to the foregoing method, the cyclic shift values of sequences of reference signals sent by the terminal device on a same frequency domain resource for two or more consecutive times can be randomized, so that the interference between reference signals sent for two or more times on a same time-frequency resource by any two terminal devices that determine the reference signals by using different ZC sequences can be randomized. In this way, time-domain filtering performance for the reference signal is improved, and channel estimation accuracy is also improved.

In a possible implementation, the first parameter $\theta_1$ satisfies the following formula:

$\theta_1 = n_{cs}(n_f, n_{s,f}^\mu, L, T_S) \mod Q$, where $$n_{cs}(n_f, n_{s,f}^\mu, L, T_s) = \sum_{m=0}^{T-1} 2^m c\left(T\left\lfloor \frac{N_{slot}^{frame,\mu} n_f + n_{s,f}^\mu - L}{T_S} \right\rfloor + m\right),$$

and m=0, 1, 2, ..., T−1; $n_{s,f}^\mu$ is a slot number, in a system frame, of a slot that the reference signal is in; $n_f$ is a number of the system frame that the reference signal is in; $N_{slot}^{frame,\mu}$ is a quantity of slots in a system frame; $T_S$ is a sending periodicity of the reference signal; L is an integer; T is a positive integer; c(•) is a pseudo-random sequence; and mod is a modulo operation.

According to the foregoing method, the cyclic shift values of sequences of reference signals sent by the terminal device in any two sending periodicities of reference signals can be randomized, so that the interference between reference signals from any two terminal devices that determine the reference signals by using different ZC sequences can be randomized. In this way, the time-domain filtering performance for the reference signal is improved, and channel estimation accuracy is improved.

In a possible implementation, the first parameter $\theta_1$ satisfies the following formula:

$\theta_1 = n_{cs}(n_f, n_{s,f}^\mu, l) \mod Q$, where $n_{cs}(n_f, n_{s,f}^\mu, l) = \sum_{m=0}^{T-1} 2^m c(TS(N_{slot}^{frame,\mu} n_f + n_{s,f}^\mu) + Tl + m)$, and m=0, 1, 2, ..., T−1; $n_{s,f}^\mu$ is a slot number, in a system frame, of a slot that the reference signal is in; $n_f$ is a number of the system frame that the reference signal is in; $N_{slot}^{frame,\mu}$ is a quantity of slots in a system frame; l is a symbol number, in the slot, of a symbol that the reference signal is in, $0 \leq l \leq N_{symb}^{slot} - 1$, and that l=0 corresponds to a $1^{st}$ symbol in the slot; T is a positive integer; S is a positive integer; c(•) is the pseudo-random sequence; and mod is a modulo operation.

According to the foregoing method, the cyclic shift values of the sequences of reference signals sent by the terminal device on any two or more symbols can be randomized, so that the interference between reference signals sent on any two or more symbols by any two terminal devices that determine the reference signals by using different ZC sequences can be randomized. In this way, the time-domain filtering performance for the reference signal is improved, and the channel estimation accuracy is also improved.

In a possible implementation, the first parameter is determined based on a first cyclic shift interval, where the first cyclic shift interval is determined from a first pattern based on information about a first time unit, the first pattern includes Y cyclic shift intervals, and Y is an integer greater than 1; or the first parameter is determined based on a first cyclic shift step and information about a first time unit; or the first parameter is determined based on a first initial cyclic shift step, a first cyclic shift step gap, and information about a first time unit, where the information about the first time unit includes a number of a system frame that the first time unit is in, and/or a slot number, in the current system frame, of a slot that the first time unit is in; and the first time unit is a time unit that the reference signal is in.

In a possible implementation, when the first parameter is determined based on the first cyclic shift interval, the cyclic shift value α is determined based on λ, where λ satisfies the following formula:

$$\lambda = \frac{2\pi}{Q}\left(\beta_{\left\lfloor \frac{N_{slot}^{frame,\mu} n_f + n_{s,f}^\mu - L}{T_S} \right\rfloor \mod Y} \mod Q\right) + \frac{2\pi}{Z}(\theta_2),$$

where $\beta_{\left\lfloor \frac{N_{slot}^{frame,\mu} n_f + n_{s,f}^\mu - L}{T_S} \right\rfloor \mod Y}$ is the first cyclic shift interval;

$\beta_{\left\lfloor \frac{N_{slot}^{frame,\mu} n_f + n_{s,f}^\mu - L}{T_S} \right\rfloor \mod Y} \mod Q$ is the first parameter and $\theta_2$ is the second parameter; $N_{slot}^{frame,\mu}$ is a quantity of slots in a system frame; $n_f$ is a number of the system frame that the reference signal is in; $n_{s,f}^\mu$ is a slot number, in the current system frame, of the slot that the reference signal is in; L is an integer; $T_s$ is a sending periodicity of the reference signal; Z is a positive integer; $\lfloor \ \rfloor$ is a rounding down operation; and mod is a modulo operation.

In the foregoing method procedure, a difference between cyclic shift values used by any two terminal devices in a cell to determine reference signals can be randomized. Further, interference between reference signals sent by the terminal devices can be reduced, the interference can be randomized, and channel time-domain filtering performance can be improved.

In a possible implementation, when the first parameter is determined based on the first cyclic shift step and the information about the first time unit, the cyclic shift value α is determined based on λ, where λ satisfies the following formula:

$$\lambda = \frac{2\pi}{Q}\left(\left(\Delta \text{hopping} \times \left\lfloor \frac{N_{slot}^{frame,\mu} n_f + n_{s,f}^\mu - L}{T_S} \right\rfloor\right) \mod Q\right) + \frac{2\pi}{Z}(\theta_2),$$

where
Δhopping is the first cyclic shift step;

$\left(\Delta \text{hopping} \times \left\lfloor \frac{N_{slot}^{frame,\mu} n_f + n_{s,f}^\mu - L}{T_S} \right\rfloor\right) \mod Q$ is the first parameter and $\theta_2$ is the second parameter; $N_{slot}^{frame,\mu}$ is a quantity of slots in a system frame; $n_f$ is a number of the system frame that the reference signal is in; $n_{s,f}^\mu$ is a slot number, in the current system frame, of the slot that the reference signal is in; L is an integer; $T_S$ is a sending periodicity of the reference signal; Z is a positive integer; $\lfloor \ \rfloor$ is a rounding down operation; and mod is a modulo operation.

In a possible implementation, when the first parameter is determined based on the first initial cyclic shift step, the first cyclic shift step gap, and the information about the first time unit, the cyclic shift value α is determined based on λ, where λ satisfies the following formula:

$$\lambda = \frac{2\pi}{Q}\left(\left(\Delta h_{init} \times N_{T_S} + \Delta h_{gap} \times \frac{N_{T_S} \times (N_{T_S} - 1)}{2}\right) \bmod Q\right) + \frac{2\pi}{Z}(\theta_2)$$

$$N_{T_S} = \left\lfloor \frac{N_{slot}^{frame,\mu} n_f + n_{s,f}^{\mu} - L}{T_S} \right\rfloor, \text{ where}$$

$$\left(\Delta h_{init} \times N_{T_S} + \Delta h_{gap} \times \frac{N_{T_S} \times (N_{T_S} - 1)}{2}\right) \bmod Q$$

is the first parameter and $\theta_2$ is a second parameter; $N_{slot}^{frame,\mu}$ is a quantity of slots in a system frame; $n_f$ is a number of the system frame that the reference signal is in; $n_{s,f}^{\mu}$ is a slot number, in the current system frame, of the slot of the reference signal; L is an integer; $\Delta h_{init}$ is the first initial cyclic shift step; $\Delta h_{gap}$ is the first cyclic shift step gap; $T_S$ is a sending periodicity of the reference signal; $\lfloor \ \rfloor$ is a rounding down operation; and mod is a modulo operation.

In a possible implementation, the second parameter $\theta_2$ satisfies the following formula: $\theta_2$=K mod Z where K is determined based on configuration information.

In a possible implementation, Z is $n_{RS}^{cs,max}$, and $n_{RS}^{cs,max}$ is a maximum cyclic shift value.

In a possible implementation, Q is a sequence length of the reference signal, or Q is a quantity of subcarriers occupied by the reference signal.

According to a third aspect, this application provides a reference signal transmission method. The method is performed by a terminal device or a module in the terminal device. An example in which the method is performed by the terminal device is used herein for description. The method includes: generating a sequence of a reference signal, where at least two of a cyclic shift value, a sequence group number, and a sequence number of the sequence are determined based on a pseudo-random sequence; and sending the reference signal based on the sequence.

According to a fourth aspect, this application provides a reference signal transmission method. The method is performed by a network device or a module in the network device. An example in which the method is performed by the network device is used herein for description. The method includes: generating a sequence of a reference signal, where at least two of a cyclic shift value, a sequence group number, and a sequence number of the sequence are determined based on a pseudo-random sequence; and performing signal detection based on the sequence.

According to the foregoing method, at least two of the cyclic shift value, the sequence group number, and the sequence number are determined based on the pseudo-random sequence, so that the cyclic shift value, the sequence group number, and the sequence number can be effectively randomized. In this way, interference between reference signals can be effectively randomized, and channel estimation accuracy can be improved.

Based on the foregoing third aspect or fourth aspect, the following possible implementations further exist:

In a possible implementation, Q is greater than Z.

In a possible implementation, the pseudo-random sequence is determined based on attribute information of the reference signal.

In a possible implementation, the attribute information includes a sequence identifier; or the sequence is generated based on a ZC sequence, and the attribute information includes a root index of the ZC sequence.

In a possible implementation, when the cyclic shift value is determined based on the pseudo-random sequence, the cyclic shift value α satisfies the following formula:

$$\alpha = \frac{2\pi \cdot t_1}{Q}(\theta_1) + \frac{2\pi \cdot t_2}{Z}(\theta_2), \text{ or } \alpha = \left(\frac{2\pi}{Q}(\theta_1) + \frac{2\pi}{Z}(\theta_2)\right) \bmod 2\pi,$$

where $\theta_1$ is a first parameter and $\theta_2$ is a second parameter; and $t_1$ is a first coefficient, $t_2$ is a second coefficient, and neither the first coefficient nor the second coefficient is equal to 0.

In a possible implementation, the first parameter $\theta_1$ satisfies the following formula:

$$\theta_1 = n_{cs}\left(n_{s,f}^{\mu}, l\right) \bmod Q,$$

$$\theta_1 = n_{cs}(n_s) \bmod Q,$$

$$\theta_1 = n_{cs}\left(n_f, n_{s,f}^{\mu}, L, T_S\right) \bmod Q, \text{ or}$$

$$\theta_1 = n_{cs}\left(n_f, n_{s,f}^{\mu}, l\right) \bmod Q, \text{ where}$$

$$n_{cs}\left(n_{s,f}^{\mu}, l\right) = \sum_{m=0}^{T-1} 2^m c\left(TN_{symb}^{slot} n_{s,f}^{\mu} + Tl + m\right);$$

$$n_{cs}(n_s) = \sum_{m=0}^{T-1} 2^m c(Tn_s + m);$$

$$n_{cs}\left(n_f, n_{s,f}^{\mu}, L, T_S\right) = \sum_{m=0}^{T-1} 2^m c\left(T\left\lfloor \frac{N_{slot}^{frame,\mu} n_f + n_{s,f}^{\mu} - L}{T_S} \right\rfloor + m\right);$$

and $n_{cs}\left(n_f, n_{s,f}^{\mu}, l\right) = \sum_{m=0}^{T-1} 2^m c\left(TS\left(N_{slot}^{frame,\mu} n_f + n_{s,f}^{\mu}\right) + Tl + m\right),$ and m=0, 1, 2, . . . , T−1, where Q is a positive integer and T is a positive integer; $n_f$ is a number of a system frame in which the reference signal is in; $N_{slot}^{frame,\mu}$ is a quantity of slots in a system frame; $n_{s,f}^{\mu}$ is a slot number, in the system frame, of a slot that the reference signal is in; $N_{symb}^{slot}$ is a quantity of orthogonal frequency division multiplexing OFDM symbols in a slot; l is a symbol number, in the slot, of a symbol that the reference signal is in, $0 \leq l \leq N_{symb}^{slot}-1$, and that l=0 corresponds to a $1^{st}$ symbol in the slot; $n_S$ is a count value of a reference signal counter; $T_S$ is a sending periodicity of the reference signal; c(•) is the pseudo-random sequence; and mod a modulo operation.

In a possible implementation, the second parameter $\theta_1$ satisfies the following formula: $\theta_2$=K mod Z, where K is determined based on configuration information.

In a possible implementation, when the cyclic shift value is determined based on the pseudo-random sequence, the cyclic shift value α satisfies the following formula:

$$\alpha = \frac{2\pi}{Q}\left((K + n_{cs}(n_{s,f}^{\mu}, l)) \bmod Q\right),$$

-continued $$\alpha = \frac{2\pi}{Q}((K + n_{cs}(n_S)) \bmod Q),$$

$$\alpha = \frac{2\pi}{Q}\left(\left(K + n_{cs}\left(n_f, n_{s,f}^\mu, L, T_S\right)\right) \bmod Q\right), \text{ or}$$

$$\alpha = \frac{2\pi}{Q}\left(\left(K + n_{cs}\left(n_f, n_{s,f}^\mu, l\right)\right) \bmod Q\right), \text{ where}$$

$$n_{cs}\left(n_{s,f}^\mu, l\right) = \sum_{m=0}^{T-1} 2^m c\left(TN_{symb}^{slot} n_{s,f}^\mu + Tl + m\right);$$

$$n_{cs}(n_s) = \sum_{m=0}^{T-1} 2^m c(Tn_S + m);$$

$$n_{cs}\left(n_f, n_{s,f}^\mu, L, T_S\right) = \sum_{m=0}^{T-1} 2^m c\left(T\left\lfloor \frac{N_{slot}^{frame,\mu} n_f + n_{s,f}^\mu - L}{T_S}\right\rfloor + m\right);$$

and $n_{cs}\left(n_f, n_{s,f}^\mu, l\right) = \sum_{m=0}^{T-1} 2^m c\left(TS\left(N_{slot}^{frame,\mu} n_f + n_{s,f}^\mu\right) + Tl + m\right),$ and m=0, 1, 2, . . . , T−1, where
K is determined based on configuration information; Q is a positive integer and T is a positive integer; $n_{s,f}^\mu$ is a slot number, in a system frame, of a slot that the reference signal is in; $n_f$ is a number of the system frame that the reference signal is in; $N_{symb}^{slot}$ is a quantity of orthogonal frequency division multiplexing OFDM symbols in a slot; l is a symbol number, in the slot, of a symbol that the reference signal is in, $0 \leq l \leq N_{symb}^{slot} - 1$, and that l=0 corresponds to a $1^{st}$ symbol in the slot; $N_{slot}^{frame,\mu}$ is a quantity of slots in a system frame; $n_S$ is a count value of a reference signal counter; $T_S$ is a sending periodicity of the reference signal; c(•) is the pseudo-random sequence; $\lfloor \ \rfloor$ a rounding down operation; and mod is a modulo operation.

In a possible implementation, Z is $n_{RS}^{cs,max}$, and $n_{RS}^{cs,max}$ is a maximum cyclic shift value.

In a possible implementation, when the sequence group number is determined based on the pseudo-random sequence, the sequence group number u satisfies the following formula:

$u=(f_{gh}(n_{s,f}^\mu,l)+A) \bmod W$, or $u=(f_{gh}(n_f,n_{s,f}^\mu,l)+A) \bmod W$, where $$f_{gh}\left(n_{s,f}^\mu, l\right) = \left(\sum_{m=0}^{T-1} 2^m c\left(TN_{symb}^{slot} n_{s,f}^\mu + Tl + m\right)\right) \bmod W,$$

and m=0, 1, 2, . . . , T−1; and $$f_{gh}\left(n_f, n_{s,f}^\mu, l\right) = \left(\sum_{m=0}^{T-1} 2^m c\left(TS\left(N_{slot}^{frame,\mu} n_f + n_{s,f}^\mu\right) + Tl + m\right)\right) \bmod W,$$

and m=0, 1, 2, . . . , T−1, where
W, A, and T are integers; $n_f$ is a number of a system frame that the reference signal is in; $N_{slot}^{frame,\mu}$ is a quantity of slots in a system frame; $n_{s,f}^\mu$ is a slot number, in the system frame, of a slot that the reference signal is in; $N_{symb}^{slot}$ is a quantity of orthogonal frequency division multiplexing OFDM symbols in a slot; l is a symbol number, in the slot, of a symbol that the reference signal is in, $0 \leq l \leq N_{symb}^{slot} - 1$, and that l=0 corresponds to a $1^{st}$ symbol in the slot; c(•) is the pseudo-random sequence; and mod is a modulo operation.

In a possible implementation, when the sequence number is determined based on the pseudo-random sequence, the sequence number v satisfies the following formula:

$$v = \begin{cases} c\left(T\left(n_f N_{slot}^{frame,\mu} N_{sysmb}^{slot} + n_{s,f}^\mu N_{sysmb}^{slot} + l\right)\right) & Q \geq E \\ 0 & Q < E \end{cases}, \text{ or}$$

$$v = \begin{cases} c\left(T\left(n_{s,f}^\mu N_{sysmb}^{slot} + l\right)\right) & Q \geq E \\ 0 & Q < E \end{cases},$$

where
E and T are positive integers; $n_f$ is the number of the system frame that the reference signal is in; $N_{slot}^{frame,\mu}$ is the quantity of the slots in the system frame; $n_{s,f}^\mu$ is the slot number, in the system frame, of the slot that the reference signal is in; $N_{symb}^{slot}$ is the quantity of the orthogonal frequency division multiplexing OFDM symbols in the slot; l is the symbol number, in the current slot, of the symbol of the reference signal, $0 \leq l \leq N_{symb}^{slot} - 1$, and that l=0 corresponds to a $1^{st}$ symbol in the current slot; and c(•) is the pseudo-random sequence.

In a possible implementation, Q is a sequence length of the reference signal, or Q is a quantity of subcarriers occupied by the reference signal.

According to a fifth aspect, this application further provides a communication apparatus. The communication apparatus has a function of implementing any method according to any one of the first aspect to the fourth aspect. The communication apparatus may be a network device or a terminal device. The communication apparatus may be implemented by hardware, or may be implemented by executing corresponding software by hardware. The hardware or the software includes one or more units or modules corresponding to the foregoing function.

In a possible implementation, the communication apparatus includes a processor. The processor is configured to support the communication apparatus in performing a corresponding function in the foregoing method. The communication apparatus may further include a memory. The memory may be coupled to the processor, and stores program instructions and data that are necessary for the communication apparatus. Optionally, the communication apparatus further includes a communication interface. The communication interface is configured to support communication between the communication apparatus and another device.

In a possible implementation, the communication apparatus includes corresponding functional modules, configured to implement steps in the foregoing method. The function may be implemented by hardware, or may be implemented by executing corresponding software by hardware. The hardware or software includes one or more modules corresponding to the foregoing function.

In a possible implementation, a structure of the communication apparatus includes a processing unit and a communication unit. These units may perform corresponding functions in the foregoing method examples. For details, refer to the descriptions in the method according to the first aspect. Details are not described herein again.

According to a sixth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement, through a logic circuit or by executing code instructions, the method according to any one of the first aspect or the possible implementations of the aspects.

According to a seventh aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement, through a logic circuit or by executing code instructions, a functional module for implementing the method according to any one of the second aspect or the possible implementations of the second aspect.

According to an eighth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement, through a logic circuit or by executing code instructions, a functional module for implementing the method according to any one of the third aspect or the possible implementations of the third aspect.

According to a ninth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement, through a logic circuit or by executing code instructions, a functional module for implementing the method according to any one of the fourth aspect or the possible implementations of the fourth aspect.

According to a tenth aspect, a computer-readable storage medium is provided. The computer-readable storage medium stores a computer program or instructions, and when the computer program or the instructions are executed by a processor, the method according to any one of the first aspect, the third aspect, the fifth aspect, the seventh aspect, or the possible implementations of any one of the aspects is implemented.

According to an eleventh aspect, a computer program product including instructions is provided. When the instructions are run by a processor, the method according to any one of the first aspect to the fourth aspect, or the possible implementations of any one of the aspects is implemented.

According to a twelfth aspect, a chip system is provided. The chip system includes a processor, and may further include a memory, to implement the method according to any one of the first aspect to the fourth aspect, or the possible implementations of any one of the aspects. The chip system may include a chip, or may include a chip and another discrete component.

According to a thirteenth aspect, a communication system is provided. The system includes the apparatus (for example, the terminal device) according to the sixth aspect and the apparatus (for example, the network device) according to the seventh aspect.

According to a fourteenth aspect, a communication system is provided. The system includes the apparatus (for example, the terminal device) according to the eighth aspect and the apparatus (for example, the network device) according to the ninth aspect.

DESCRIPTION OF EMBODIMENTS

The following further describes in detail embodiments of this application with reference to accompanying drawings.

Embodiments of this application may be applied to various mobile communication systems, for example, a new radio (NR) system, a long term evolution (LTE) system, a long term evolution advanced (LTE-A) system, a universal mobile telecommunications system (UMTS), an evolved long term evolution (eLTE) system, and another communication system such as a future communication system. This is not limited herein.

A terminal device in embodiments of this application may be a device having a wireless transceiver function or a chip that can be disposed in any device, or may also be referred to as user equipment (UE), an access terminal, a subscriber unit, a subscriber station, a mobile station, a mobile console, a remote station, a remote terminal, a mobile device, a user terminal, a wireless communication device, a user agent, or a user apparatus. The terminal device in embodiments of this application may be a mobile phone, a tablet computer (Pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid (smart grid), a wireless terminal in transportation safety, a wireless terminal in a smart city (smart city), a wireless terminal in a smart home (smart home), or the like.

A network device may be a wireless access device in various standards, for example, an evolved NodeB (eNB), a radio network controller (RNC), a NodeB (NB), a base station controller (BSC), a base transceiver station (BTS), a home NodeB (for example, a home evolved NodeB or a home Node B, HNB), a baseband unit (BBU), an access point (AP) in a wireless fidelity (WIFI) system, a wireless relay node, a wireless backhaul node, or a transmission point (TRP, or transmission point, TP). The network device may alternatively be a gNB or a transmission point (TRP or TP) in a 5G (NR) system, one antenna panel or a group of antenna panels (including a plurality of antenna panels) of a base station in a 5G system, a network node such as a baseband unit that is included in a gNB or a transmission point, or a DU in a centralized-distributed (CU-DU) architecture.

Figure 1:
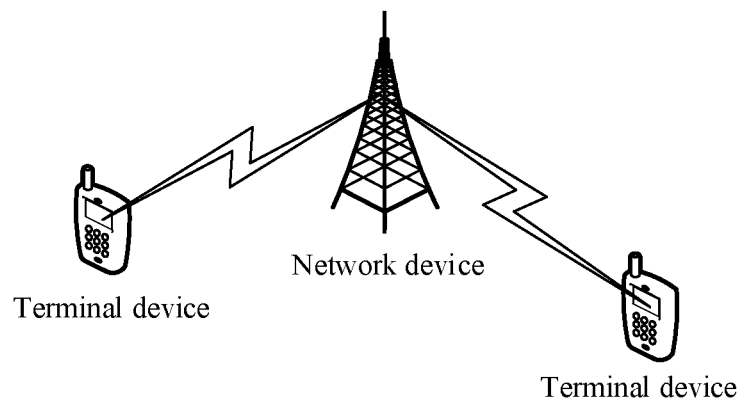
FIG. 1 is a schematic diagram of a network architecture to which an embodiment of this application is applicable.

FIG. 1 is a schematic diagram of a network architecture to which an embodiment of this application is applicable. As shown in FIG. 1, a terminal device may access a network device, to access a service of an external network (for example, a data network (data network, DN)) through the network device, or communicate with another device through the network device, for example, communicate with another terminal device.

In the network shown in FIG. 1, the terminal device may send a reference signal to the network device, so that the network device can perform an operation such as channel quality estimation based on the reference signal. The reference signal includes but is not limited to a DMRS, an SRS, and the like.

For example, when the reference signal is an SRS, an SRS sequence $r_{u,v}(n)$ whose length is M may be generated based on a base sequence $\bar{r}_{u,v}(n)$ through the following formula:

$$r_{u,v}(n) = e^{j\alpha n}\bar{r}_{u,v}(n), 0 \leq n \leq M, \text{ where}$$

$$\bar{r}_{u,v}(n) = x_q(n \bmod N_{ZC})$$

$$x_q(m) = e^{-j\frac{\pi qm(m+1)}{N_{ZC}}},$$

$$q = \lfloor \bar{q} + 1/2 \rfloor + v(-1)^{\lfloor 2\bar{q} \rfloor},$$

and $\bar{q} = N_{ZC}(u + 1)/31$, where $N_{ZC}$ is a length of the base sequence $\bar{r}_{u,v}(n)$; $\alpha$ is a cyclic shift value and is determined by the network device; q is a root index (root index); J is an imaginary unit; and u is a sequence group number, v is a sequence number, v=0 or v=1, u=0, 1, . . . , 29, and specific values of u and v are configured by the network device. The base sequence $\bar{r}_{u,v}(n)$ may be a sequence generated based on a ZC sequence, for example, is the ZC sequence or a sequence generated by performing a cyclic shift on the ZC sequence.

In the 3rd generation partnership project (3GPP) standard, a plurality of values are defined for a length M of an SRS sequence, and 60 base sequences are defined for each value of M that is greater than or equal to 72. The 60 base sequences are generated based on ZC sequences having a same length and different root indexes. For an SRS sequence whose length is M, a maximum prime number $N_{ZC}$ that is less than or equal to M is determined as a length of a ZC sequence for generating the SRS sequence. Further, the 60 base sequences are divided into 30 groups, and base sequences in different groups may be allocated to different cells. That M=72 is used as an example. The 30 groups of base sequences are generated based on ZC sequences whose lengths are 71. For a relationship between root indexes of these ZC sequences and group numbers of the base sequences, refer to Table 1.

TABLE 1

| | Sequence group number u | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Root index | 2 | 5 | 7 | 9 | 11 | 14 | 16 | 18 | 21 | 23 | 25 | 27 | 30 | 32 | 34 |
| | 3 | 4 | 6 | 10 | 12 | 13 | 17 | 19 | 20 | 22 | 26 | 28 | 29 | 33 | 35 |
| | Sequence group number u | | | | | | | | | | | | | | |
| | 15 | 16 | 17 | 18 | 19 | 20 | 21 | 22 | 23 | 24 | 25 | 26 | 27 | 28 | 29 |
| Root index | 37 | 39 | 41 | 44 | 46 | 48 | 50 | 53 | 55 | 57 | 60 | 62 | 64 | 66 | 69 |
| | 36 | 38 | 42 | 43 | 45 | 49 | 51 | 52 | 54 | 58 | 59 | 61 | 65 | 67 | 68 |

It can be learned from Table 1 that there are two root indexes in each group, and which root index is specifically used is determined based on v. For example, when the sequence group number u=1, two index indexes, namely, 5 and 4, are included in this group. When v=0, the root index is 5, and when v=1, the root index is 4. Currently, when no frequency hopping is performed, a value of v is generally 0 by default. For a same SRS length M, different base sequences correspond to different root values of the ZC sequence, that is, the basic sequences are in a one-to-one correspondence with the root values of the ZC sequence.

Currently, the cyclic shift value is configured by the network device. For a same base sequence, different SRS sequences may be obtained by using different cyclic shift values $\alpha$. If there are two cyclic shift values $\alpha_1$ and $\alpha_2$, when $\alpha_1$ and $\alpha_2$ satisfy $\alpha_1 \bmod 2\pi \neq \alpha_2 \bmod 2\pi$, a sequence $x_1(m)$ obtained based on a base sequence r(m) and $\alpha_1$, and a sequence $x_2(m)$ obtained based on the base sequence r(m) and $\alpha_2$ are orthogonal to each other, that is, a cross-correlation coefficient is zero. Lengths of the sequences xi(m) and $x_2(m)$ are M, and m=0, 1, . . . , M−1. The cross-correlation coefficient is defined as:

$$\left| \frac{1}{M} \sum_{m=0}^{M-1} x_1(m) x_2^*(m) \right|.$$

When the cross-correlation coefficient is 0, SRS sequences obtained based on a same base sequence and different cyclic shift values $\alpha$ may be allocated to different terminal devices, so that these terminal devices may send, on a same time-frequency resource, these SRS sequences generated based on a cyclic shift of the same base sequence. When channels of the terminal devices are flat within the lengths of the SRS sequences, there is no interference between the terminal devices caused by these SRS sequences.

For SRS sequences obtained based different base sequences, interference between SRS sequences obtained by using a same cyclic shift value $\alpha$ or between SRS sequences obtained by using different cyclic shift values $\alpha$ is not 0. In other words, SRS sequences obtained based on a same cyclic shift value or different cyclic shift values of different base sequences are allocated to different terminal devices, so that these terminal devices may send, on a same time-frequency resource, these SRS sequences generated based on cyclic shifts of the different base sequences. When channels of the terminal devices are flat within the lengths of the SRS sequences, there is interference between the terminal devices caused by these SRS sequences.

For example, as shown in Table 2, two cells respectively correspond to two base sequences. Each cell includes two terminal devices, and the two terminal devices in each cell use two different cyclic shift values of a same base sequence. Therefore, four terminal devices UE 1 to UE 4 may send SRSs on a same time-frequency resource.

TABLE 2

| UE 1: base sequence 1, $\alpha_1$ | UE 2: base sequence 1, $\alpha_2$ |
|---|---|
| UE 3: base sequence 2, $\alpha_3$ | UE 4: base sequence 2, $\alpha_4$ |

To improve accuracy of channel estimation, channel estimation can be performed through time-domain filtering. To be specific, weighted average is performed on several adjacent SRS channel estimation results. In this way, precision of the channel estimation is improved. In a sending periodicity of an SRS, there are two base sequences $s_1$ and $s_2$. The UE 1 and UE 2 perform channel estimation by using two different cyclic shifts $\alpha_1$ and $\alpha_2$ of the base sequence $s_1$, and the UE 3 and UE 4 perform channel estimation by using two different cyclic shifts $\alpha_3$ and $\alpha_4$ of the base sequence $s_2$, provided that channels of the four terminal devices on M subcarriers of an SRS sequence are flat, and are respectively $h_1$, $h_2$, $h_3$, and $h_4$. On a $k^{th}$ subcarrier of the M subcarriers occupied by the SRS sequence, a signal y(k) received by the network device is:

$$y(k) = h_1 s_1(k) e^{j\alpha_1 k} + h_2 s_1(k) e^{j\alpha_2 k} + h_3 s_2(k) e^{j\alpha_3 k} + h_4 s_2(k) e^{j\alpha_4 k}$$

To estimate the channel $h_1$ of the UE 1, the network device performs a related operation on the received signal and the SRS sequence used by the UE:

$$\frac{1}{M} \sum_{k=0}^{M-1} y(k) \times (s_1(k) e^{j\alpha_1 k})^* =$$

$$h_1 + \frac{1}{M} h_3 \sum_{k=0}^{M-1} s_2(k) s_1^*(k) e^{j(\alpha_3 - \alpha_1)k} + \frac{1}{M} h_4 \sum_{k=0}^{M-1} s_2(k) s_1^*(k) e^{j(\alpha_4 - \alpha_1)k},$$

where $\frac{1}{M} h_3 \sum_{k=0}^{M-1} s_2(k) s_1^*(k) e^{j(\alpha_3 - \alpha_1)k}$ is interference caused by the UE 3 to the channel estimation performed by the UE 1; and $$\frac{1}{M} h_4 \sum_{k=0}^{M-1} s_2(k) s_1^*(k) e^{j(\alpha_4 - \alpha_1)k}$$

is interference caused by the UE 4 to the channel estimation performed by the UE1. When the channels remain unchanged in several consecutive SRS measurement periodicities and interference caused by the UE3 and the UE4 to the UE1 is random in the several SRS measurement periodicities, time-domain filtering may be performed on estimated channels obtained in the several SRS measurement periodicities, so that more accurate channel estimation results can be obtained.

It can be learned from the interference caused by the UE 3 to the UE 1 and the interference caused by the UE 4 to the UE 1 that a value of interference between SRS sequences of two terminal devices is determined by a cyclic shift difference between the two SRS sequences. However, in conventional technologies, because the cyclic shift difference remains unchanged, the interference cannot be randomized. As a result, inter-cell SRS interference increases. Further, precision of channel estimation performed by a terminal device at a cell edge decreases. Similarly, if two terminal devices in a cell send SRSs on a same time-frequency resource using different basic sequences, intra-cell SRS interference also increases. Further, precision of channel estimation performed by the two terminal devices decreases.

In embodiments of this application, the cyclic shift value is determined through randomization, so that interference between reference signals is randomized, and accuracy of channel estimation is improved. Details are described below.

For ease of description, the following describes parameters that may be used in this application.

$n_{s,f}^{\mu}$ is a slot number, in a system frame, of a slot that the reference signal is in, and the slot number is related to a subcarrier spacing. For example, when the subcarrier spacing is 15 kHz, the slot number is an integer from 0 to 9. $\mu$ is a configuration value of the subcarrier spacing, and is in a one-to-one correspondence with the subcarrier spacing in value.

$N_{symb}^{slot}$ is a quantity of orthogonal frequency division multiplexing (OFDM) symbols in a slot. l is a symbol number, in the slot, of a symbol that the reference signal is in, $0 \leq l \leq N_{symb}^{slot} - 1$, and that l=0 corresponds to a $1^{st}$ symbol in the slot. For example, if the reference signal is sent on the $11^{th}$ symbol in the current slot, l=10. In the following descriptions, an OFDM symbol may be referred to as a symbol for short. It should be understood that, l may alternatively be replaced with $l=l_0+l'$, where $l_0$ is a number of a start OFDM symbol of the reference signal in the current slot, l' is a number of a symbol that is occupied by the reference signal and that is of OFDM symbols in a reference signal resource, and $l' \in \{0, 1, \ldots, N_{symb}^{SRS} - 1\}$.

$N_{sc}^{RB}$ is a quantity of subcarriers occupied by a resource block.

$N_{slot}^{frame,\mu}$ is a quantity of slots in a system frame. $n_S$ is a count value of a reference signal counter. $T_S$ is a sending periodicity of the reference signal. $T_{offset}$ is a slot offset value of the reference signal. $T_S$ and $T_{offset}$ are determined based on a predefined rule and/or configuration information of the network device. R is a repetition factor (repetition factor) of the reference signal, and is determined based on the predefined rule and/or the configuration information of the network device. B is a preset integer, or an integer determined based on the predefined rule and/or the configuration information of the network device. $\lfloor \, \rfloor$ is a rounding down operation, and mod is a modulo operation.

$N_{symb}^{SRS}$ is a total quantity of OFDM symbols occupied by the reference signal resource, and $N_{ap}^{SRS}$ is a quantity of antenna ports corresponding to the reference signal resource.

In embodiments of this application, unless otherwise specified, when a same parameter appears below, the meaning of the parameter is the same as that described above. Details are not described again.

It should be understood that, in embodiments of this application, a reference signal resource includes one or more antenna ports, and each antenna port may correspond to a sequence. Each sequence may be generated according to the methods in embodiments of this application, to further generate a reference signal including a plurality of antenna ports. For example, an SRS resource includes $N_{ap}^{SRS}$ antenna ports that correspond to $N_{ap}^{SRS}$ sequences in total.

It should be understood that, in embodiments of this application, a reference signal resource includes one or more antenna ports. Different antenna ports in a reference signal resource may occupy a same symbol, and are multiplexed by performing frequency division (occupying different subcarriers) or code division (using different cyclic shifts of different ZC sequences or a same sequence). This is not limited in embodiments of this application. There is a correspondence between a reference signal resource and a reference signal. For a specific correspondence, refer to descriptions in an existing standard. Further, in some scenarios, the reference signal resource and the reference signal may be equivalent.

It should be further understood that in embodiments of this application, an SRS is used as an example. Sequences used by an SRS corresponding to a reference signal resource in OFDM symbols may be different or may be the same. This is determined through a sequence generation formula of the reference signal. For example, according to the method of generating an SRS sequence through a formula (4) or a formula (11) in FIG. 2, the sequences used by the SRS corresponding to the reference signal resource in the OFDM symbols may be different, so that interference can be randomized. Similarly, according to the method of generating a sequence of a reference signal in the procedure shown in FIG. 4, that sequences used by an SRS corresponding to a reference signal resource in OFDM symbols are different may be implemented, so that interference can be randomized.

The network architecture and the service scenario described in embodiments of this application are intended to describe the technical solutions in embodiments of this application more clearly, and do not constitute a limitation on the technical solutions provided in embodiments of this application. A person of ordinary skill in the art may learn that with the evolution of the network architecture and the emergence of new service scenarios, the technical solutions provided in embodiments of this application are also applicable to similar technical problems.

Figure 2:
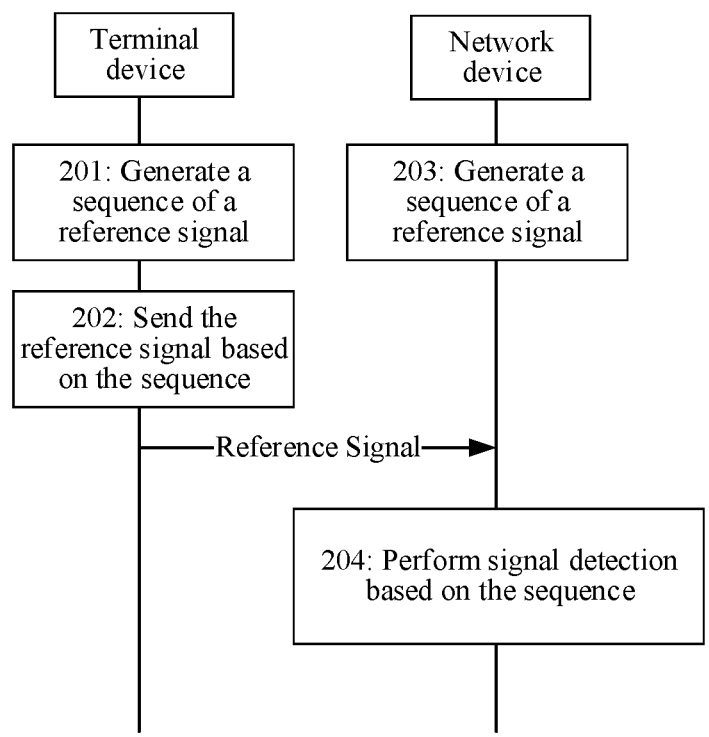
FIG. 2 is a schematic flowchart of a signal transmission method according to an embodiment of this application.

With reference to the foregoing descriptions, FIG. 2 is a schematic flowchart of a method according to an embodiment of this application. Refer to FIG. 2. The method includes the following steps.

Step 201: Generate a sequence of a reference signal.

A cyclic shift value of the sequence is determined based on a first parameter and a second parameter, the first parameter is a value from 0 to Q−1, the second parameter is a value from 0 to Z−1, Z and Q are positive integers, and Z is not equal to Q. In a possible implementation, Q is greater than Z.

Step 202: Send the reference signal based on the sequence.

The reference signal may be an uplink sounding reference signal (SRS), an uplink demodulation reference signal (DMRS), a phase tracking signal, or the like.

It should be noted that the sequence of the reference signal may be a bit sequence of a specific length. A terminal device may perform an operation such as modulation on the sequence, to obtain a corresponding radio signal. The radio signal may be referred to as a reference signal. Therefore, in some cases, the sequence of the reference signal may be referred to interchangeably with the reference signal.

Step 201 and step 202 may be performed by the terminal device.

Step 203: Generate a sequence of a reference signal.
Step 204: Perform signal detection based on the sequence.

Step 203 and step 204 may be performed by a network device. A specific implementation in which the network device generates the sequence of the reference signal may be the same as the implementation in step 201. Details are not described herein again.

It should be noted that how the sequences of the reference signals are generated by the terminal device and the network device, and the processes of generating the sequences of the reference signals are not limited in this embodiment of this application. Details are not described herein again. Correspondingly, how the detection is performed by the network device is not limited in this embodiment of this application. Details are not described herein again.

In the foregoing method procedure, the cyclic shift value of the sequence is determined based on the first parameter and the second parameter. According to the method, a difference between cyclic shift values used by any two terminal devices to determine reference signals can be randomized. Further, interference between reference signals generated by using cyclic shift values obtained by terminal devices according to the method can be reduced, the interference can be randomized, and channel time-domain filtering performance can be improved.

Figure 3:
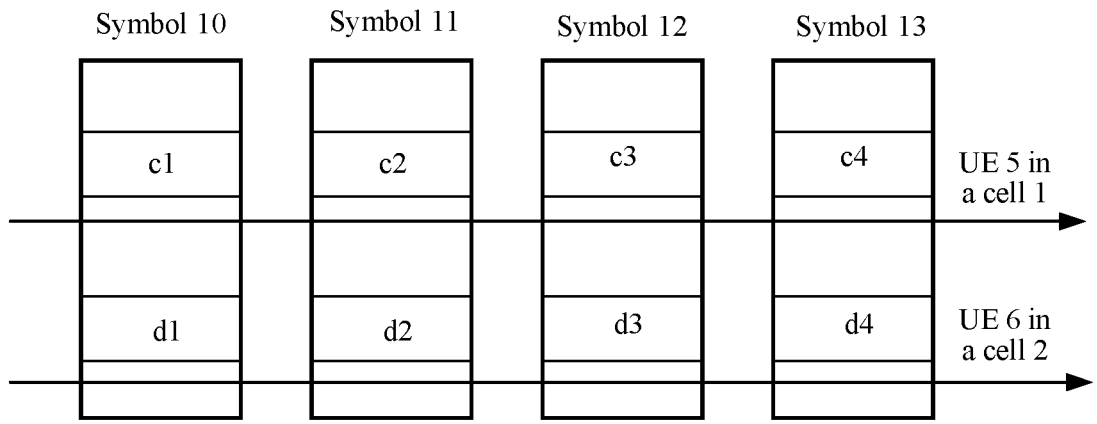
FIG. 3 is a schematic diagram of a signal according to an embodiment of this application.

The reference signal is an SRS is used as an example in the following description. As shown in FIG. 3 and Table 3, there are two terminal devices UE 5 and UE 6. The UE 5 is in a cell 1, and the UE 6 is in a cell 2. Two SRS resources corresponding to the UE 5 and the UE 6 respectively correspond to two base sequences, and each SRS resource occupies four symbols (a symbol 10, a symbol 11, a symbol 12, and a symbol 13) in a slot. The two terminal devices send the SRSs on a same time-frequency resource. According to the method in this embodiment of this application, for a correspondence between symbols and cyclic shift values, refer to Table 3. In Table 3, the cyclic shift values of the SRSs corresponding to the two terminal devices are different from each other on four symbols, that is, interference experienced on the four symbols is different. If channel estimation is performed through time-domain filtering, for example, a weighted average is performed on results of four times of SRS channel estimation performed on the symbol 10, the symbol 11, the symbol 12, and the symbol 13, it can be learned with reference to the foregoing descriptions that the precision of the channel estimation can be effectively improved.

TABLE 3

|  | Symbol 10 | Symbol 11 | Symbol 12 | Symbol 13 |
| --- | --- | --- | --- | --- |
| UE 5: base sequence 1 | Cyclic shift value c1 | Cyclic shift value c2 | Cyclic shift value c3 | Cyclic shift value c4 |
| UE 6: base sequence 2 | Cyclic shift value d1 | Cyclic shift value d2 | Cyclic shift value d3 | Cyclic shift value d4 |

It may be understood that, in the foregoing method procedure, step 201 and step 202, and step 203 and step 204 may be separately implemented. In other words, from a perspective of the terminal device, in the foregoing method procedure, only step 201 and step 202 may be performed, and from a perspective of the network device, in the foregoing method procedure, only step 203 and step 204 may be performed.

In the procedure shown in FIG. 2, the cyclic shift value may be implemented in a plurality of manners. The following separately describes the manners.

In this embodiment of this application, the cyclic shift value α may satisfy the following formula:

$$\alpha = \frac{2\pi \cdot t_1}{Q}(\theta_1) + \frac{2\pi \cdot t_2}{Z}(\theta_2), \text{ or} \quad (1)$$

$$\alpha = \left(\frac{2\pi}{Q}(\theta_1) + \frac{2\pi}{Z}(\theta_2)\right) \bmod 2\pi \quad (2)$$

$\theta_1$ is the first parameter and $\theta_2$ is the second parameter; and $t_1$ is a first coefficient, $t_2$ is a second coefficient, and neither the first coefficient nor the second coefficient is equal to 0. For example, both the first coefficient and the second coefficient are equal to 1. For another example, both the first coefficient and the second coefficient are equal to 1/2. For another example, the first coefficient is equal to 2/3, and the second coefficient is equal to 1/3. The first coefficient and the second coefficient may be preset values, or may be configured by the network device. This is not limited in this application. In embodiments of this application, Z may be predefined, or may be configured by the network device, or may be determined based on another parameter configured by the network device. For example, Z may be equal to $n_{RS}^{cs,max}$, and $n_{RS}^{cs,max}$ is a maximum cyclic shift value. The maximum cyclic shift value may be a maximum value of a cyclic shift. Q is a sequence length of the reference signal, or Q is a quantity of subcarriers occupied by the reference signal.

The foregoing is merely an example, and the foregoing formula may have other variations. Examples are not listed one by one herein.

In some embodiments of this application, the second parameter $\theta_2$ may satisfy the following formula:

$$\theta_2 = K \bmod Z \quad (3)$$

K is determined based on configuration information, and the configuration information may be sent by the network device to the terminal device.

For example, when the reference signal is an SRS, $$K = n_{SRS}^{CS} + \frac{n_{SRS}^{CS,max}(p - W_K)}{N_{ap}^{SRS}}.$$

$n_{SRS}^{CS}$ is configured by using higher layer signaling, and $n_{SRS}^{cs} \in \{0, 1, \ldots n_{SRS}^{cs,max}-1\}$. $n_{SRS}^{cs,max}$ is determined based on higher layer signaling configuration information. For example, $n_{SRS}^{CS,max}$ is determined based on $K_{TC}$ ($K_{TC}$ may be referred to as a transmission comb value). $K_{TC}$ is configured by the network device, and a correspondence between $K_{TC}$ and $n_{SRS}^{CS,max}$ may be as shown in Table 4.

TABLE 4

| $K_{TC}$ | $n_{SRS}^{CS, max}$ |
|---|---|
| 2 | 8 |
| 4 | 12 |
| 8 | 6 |

$W_K$ may be predefined, or may be configured by the network device, or may be determined in another manner. For example, $W_K = 1000$.

$N_{ap}^{SRS}$ is a quantity of antenna ports corresponding to a reference signal resource, and p is the number of the antenna port occupied by the reference signal.

For example, an SRS resource includes $N_{ap}^{SRS}$ antenna ports, and a sequence may be generated by substituting the number of each antenna port into p of the foregoing formula. Therefore, for an SRS resource that includes $N_{ap}^{SRS}$ antenna ports, $N_{ap}^{SRS}$ sequences may be generated according to the method in embodiments of this application.

With reference to the foregoing descriptions, in some embodiments of this application, the first parameter may be determined based on a pseudo-random sequence, and a specific value thereof may be implemented in a plurality of manners.

Method 1: The first parameter $\theta_1$ may satisfy the following formula:

$$\theta_1 = n_{cs}(n_{s,f}^{\mu}, l) \bmod Q \quad (4)$$

$n_{cs}(n_{s,f}^{\mu}, l) = \Sigma_{m=0}^{T-1} 2^m c(T \cdot N_{symb}^{slot} n_{s,f}^{\mu} + Tl + m)$, and m=0, 1, 2, ..., T−1; T is a positive integer, for example, T=8; and c(•) is the pseudo-random sequence.

With reference to formula (1), formula (4), and formula (5), assuming that both the first coefficient and the second coefficient are equal to 1, and the reference signal is an SRS, the cyclic shift value α of the sequence of the reference signal may satisfy the following formula:

$$\alpha = \frac{2\pi}{Q}\left(\left(\sum_{m=0}^{T-1} 2^m c\left(T N_{symb}^{slot} n_{s,f}^{\mu} + Tl + m\right)\right) \bmod Q\right) + \quad (5)$$
$$\frac{2\pi}{Z}\left(\left(n_{SRS}^{CS} + \frac{n_{SRS}^{CS,max}(p - W_K)}{N_{ap}^{SRS}}\right) \bmod Z\right)$$

According to the foregoing method, the cyclic shift values of the sequences of reference signals sent by terminal devices in a same system frame can be randomized, so that interference, in the same system frame, between any two terminal devices that determine reference signals using different ZC sequences can be randomized. In this way, time-domain filtering performance for the reference signal is improved, and channel estimation accuracy is improved.

Method 2: The first parameter $\theta_1$ may satisfy the following formula:

$$\theta_1 = n_{cs}(n_S) \bmod Q \quad (6)$$

$n_{cs}(n_S) = \Sigma_{m=0}^{T-1} 2^m x(Tn_S + m)$, and m=0, 1, 2, ..., T−1; $n_S$ is a count value of a reference signal counter; T is a positive integer; and c(•) is the pseudo-random sequence.

For example, when the reference signal is an SRS, $n_S$ in formula (6) may satisfy the following formula:

$$n_S = \left(\frac{N_{slot}^{frame,\mu} n_f + n_{s,f}^{\mu} - T_{offset}}{T_S}\right) \cdot \left(\frac{N_{symb}^{SRS}}{R}\right) + \left\lfloor\frac{l'}{R}\right\rfloor \quad (7)$$

With reference to the formula (1), the formula (3), and the formula (6), assuming that both the first coefficient and the second coefficient are equal to 1, and the reference signal is an SRS, the cyclic shift value α of the sequence of the reference signal may satisfy the following formula:

$$\alpha = \frac{2\pi}{Q}\left(\left(\sum_{m=0}^{T-1} 2^m c(Tn_S + m)\right) \bmod Q\right) + \frac{2\pi}{Z}\left(\left(n_{SRS}^{CS} + \frac{n_{SRS}^{CS,max}(p - W_K)}{N_{ap}^{SRS}}\right) \bmod Z\right) \quad (8)$$

According to the foregoing method, cyclic shift values of sequences of reference signals sent by the terminal device on a same frequency domain resource for two or more consecutive times can be randomized, so that interference between reference signals sent for two or more times on a same time-frequency resource by any two terminal devices that determine the reference signals by using different ZC sequences can be randomized. In this way, time-domain filtering performance for the reference signal is improved, and channel estimation accuracy is improved.

Method 3: The first parameter $\theta_1$ satisfies the following formula:

$$\theta_1 = n_{cs}(n_f, n_{s,f}^\mu, L, T_S) \bmod Q \quad (9)$$

$$n_{cs}(n_f, n_{s,f}^\mu, L, T_S) = \sum_{m=0}^{T-1} w^m c\left(T\left\lfloor \frac{N_{slot}^{frame,\mu} n_f + n_{s,f}^\mu - L}{T_S} \right\rfloor + m\right),$$

and m=0, 1, 2, . . . , T−1; L is an integer and may be determined in a predetermined manner and/or based on configuration information of the network device, for example, L may be equal to a slot offset value $T_{offset}$ of the reference signal; T is a positive integer; and c(•) is the pseudo-random sequence.

With reference to the formula (1), the formula (3), and the formula (9), assuming that both the first coefficient and the second coefficient are equal to 1, and the reference signal is an SRS, the cyclic shift value α of the sequence of the reference signal may satisfy the following formula:

$$\alpha = \frac{2\pi}{Q}\left(\left(\sum_{m=0}^{T-1} 2^m c\left(T\left\lfloor \frac{N_{slot}^{frame,\mu} n_f + n_{s,f}^\mu - L}{T_S} \right\rfloor + m\right)\right) \bmod Q\right) + \quad (10)$$

$$\frac{2\pi}{Z}\left(\left(n_{SRS}^{CS} + \frac{n_{SRS}^{CS,max}(p - W_K)}{N_{ap}^{SRS}}\right) \bmod Z\right)$$

According to the foregoing method, cyclic shift values of reference signals sent by the terminal device in any two sending periodicities of reference signals can be randomized, so that interference between reference signals from any two terminal devices that determine the reference signals by using different ZC sequences can be randomized. In this way, time-domain filtering performance for the reference signal is improved, and channel estimation accuracy is improved.

Method 4: The first parameter $\theta_1$ satisfies the following formula:

$$\theta_1 = n_{cs}(n_f, n_{s,f}^\mu, l) \bmod Q \quad (11)$$

$n_{cs}(n_f, n_{s,f}^\mu, l) = \sum_{m=0}^{T-1} 2^m c(TS(N_{slot}^{frame,\mu} n_f + n_{s,f}^\mu) + Tl + m)$, and m=0, 1, 2, . . . , T−1; T is a positive integer; S is a positive integer, for example, S is a quantity of OFDM symbols in a slot, that is, $S = N_{symb}^{slot}$; and c(•) is the pseudo-random sequence.

With reference to the formula (1), the formula (3), and the formula (11), assuming that both the first coefficient and the second coefficient are equal to 1, and the reference signal is an SRS, the cyclic shift value α of the sequence of the reference signal may satisfy the following formula:

$$\alpha = \frac{2\pi}{Q}\left(\left(\sum_{m=0}^{T-1} 2^m c(TS(N_{slot}^{frame,\mu} n_f + n_{s,f}^\mu) + Tl + m)\right) \bmod Q\right) + \quad (12)$$

$$\frac{2\pi}{Z}\left(\left(n_{SRS}^{CS} + \frac{n_{SRS}^{CS,max}(p - W_K)}{N_{ap}^{SRS}}\right) \bmod Z\right)$$

According to the foregoing method, cyclic shift values of sequences of reference signals sent by the terminal device on any two or more symbols can be randomized, so that interference between reference signals sent on any two or more symbols by any two terminal devices that determine the reference signals by using different ZC sequences can be randomized. In this way, time-domain filtering performance for the reference signal is improved, and channel estimation accuracy is improved.

It should be noted that according to any one of the foregoing methods, the pseudo-random sequence is determined based on attribute information of the reference signal, or is determined based on attribute information of the terminal device.

For example, the pseudo-random sequence c(•) may satisfy the following formula:

$c(n) = (x_1(n+N_C) + x_2(n+N_C)) \bmod 2$ $x_1(n+31) = (x_1(n+3) + x_1(n)) \bmod 2$ $x_2(n+31) = (x_2(n+3) + x_2(n+2) + x_2(n+1) + x_2(n)) \bmod 2$ (13)

$N_C = 1600$; $x_1(0) = 1$, $x_1(n) = 0$, n=1, 2, . . . , 30; and $x_2(n)$, n=0, 1, 2, . . . , 30 is a binary expression of an initial seed parameter $c_{init}$ of the pseudo-random sequence c(•), that is, $c_{init} = \sum_{i=0}^{30} x_2(i) \cdot 2^i$ and i=0, 1, 2, . . . , 30.

In formula (13), the initial seed parameter of the pseudo-random sequence may be determined based on the attribute information of the reference signal or the attribute information of the terminal device, so that a corresponding pseudo-random sequence is generated. Descriptions are separately given below.

The attribute information of the reference signal may include a root index of a ZC sequence used for determining the reference signal. The attribute information may further include a sequence identifier of the reference signal. The attribute information of the terminal device may be a feature for indicating that a terminal device is different from another terminal device, or a feature that is common to a group of terminal devices but that is different from that of another terminal device, for example, may include identification information of the terminal device.

The following several possible implementations are merely used as examples for description, and do not limit the attribute information in this application.

In a possible implementation method, the attribute information includes the root index q of the ZC sequence for determining the reference signal. In this implementation, the root index q and the initial seed parameter $c_{init}$ may satisfy the following relationship: $c_{init} = f_1(q)$. Values of $f_1(q)$ that are obtained based on different root indexes q are different. Because root indexes of ZC sequences corresponding to different base sequences are different, values of $c_{init}$ of terminal devices that use a same ZC sequence to generate sequences of reference signals are the same, and values of $c_{init}$ of terminal devices that use different ZC sequences to generate sequences of reference signals are different.

It should be noted that a specific implementation of $c_{init} = f_1(q)$ is not limited in embodiments of this application, and there may be a plurality of manners. For example, $c_{init} = q + K_{c1}$, where $K_{c1}$ is a preset positive integer, for example, $K_{c1} = 2$. For another example, $c_{init} = q$, to be specific, the initial seed parameter $c_{init}$ is equal to the root index q. Another case is not described again.

In this implementation, because reference signals generated based on different cyclic shifts of a same base sequence are orthogonal to each other, only interference between reference signals generated based on different base sequences needs to be considered. Because the values of root indexes q of ZC sequences corresponding to different base sequences are different, cyclic shift hopping modes for reference signals generated based on different base sequences may be different, so that interference is randomized.

In a possible implementation, the attribute information includes the sequence identifier. In this implementation, the sequence identifier $n_{ID}$ and the initial seed parameter $c_{init}$ may satisfy the following relationship: $c_{init}=f_2(n_{ID})$. Values of $f_2(n_{ID})$ that are obtained based on different sequence identifiers $n_{ID}$ are different. Because sequence identifiers of different reference signals are different, values of $c_{init}$ of terminal devices that use a same reference signal are the same, and values of $c_{init}$ of terminal devices that use different reference signals are different.

It should be noted that the reference signal corresponds to a reference signal resource, and the network device may configure various parameters for the reference signal resource. One of the parameters is the sequence identifier described above. In other words, the sequence identifier $n_{ID}$ in some embodiments of this application is a sequence identifier of the reference signal resource.

It should be noted that a specific implementation of $c_{init}=f_2(n_{ID})$ is not limited in this embodiment of this application, and there may be a plurality of manners. For example, $c_{init}=n_{ID}+K_{c2}$ where $K_{c2}$ is a preset positive integer, for example, $K_{c2}=2$. For another example, $c_{init}=n_{ID}$, to be specific, the initial seed parameter $c_{init}$ is equal to the sequence identifier $n_{ID}$. Other examples are not described again.

In this implementation, different sequence identifiers $n_{ID}$ may be configured for different terminal devices, so that cyclic shift hopping modes for reference signals sent by the different terminal devices are different. In this way, interference is randomized.

In a possible implementation, the attribute information of the terminal device may include the identification information of the terminal device. The identification information may be dedicated identification information of a terminal device. For example, the identification information may be a cell radio network temporary identity (C-RNTI) of the terminal device, an international mobile subscriber identity (IMSI) of the terminal device, or a temporary mobile station identifier (TMSI) of the terminal device. Alternatively, the identification information may be identification information shared by a group of terminal devices. This is not limited in this application.

In this implementation, the identification information $n_{ID}^{UE}$ of the terminal device and the initial seed parameter $c_{init}$ may satisfy the following relationship: $c_{init}=f_3(n_{ID}^{UE})$. Values of $f_3(n_{ID}^{UE})$ that are obtained based on different identification information $n_{ID}^{UE}$ are different. Because different terminal devices have different identification information, the values of $c_{init}$ of terminal devices that use different identification information are different.

Similarly, in this implementation, a specific implementation of $c_{init}=f_3(n_{ID}^{UE})$ is not limited. Details are not described herein.

In the foregoing embodiments, the first parameter is determined based on a pseudo-random sequence. In another embodiment of this application, the first parameter may alternatively be determined in another manner. This is described in detail below.

Method 5: The first parameter is determined based on a first cyclic shift interval, and the cyclic shift value $\alpha$ is determined based on $\lambda$. For example, $\alpha=\lambda$, where $\lambda$ satisfies the following formula:

$$\lambda = \frac{2\pi}{Q}\left(\beta\left\lfloor\frac{N_{slot}^{frame,\mu}n_f+n_{s,f}^{\mu}-L}{T_S}\right\rfloor_{mod\ Y} \mod Q\right) + \frac{2\pi}{Z}(\theta_2) \quad (14)$$

$$\beta\left\lfloor\frac{N_{slot}^{frame,\mu}n_f+n_{s,f}^{\mu}-L}{T_S}\right\rfloor_{mod\ Y}$$

is the first cyclic shift interval, and $$\beta\left\lfloor\frac{N_{slot}^{frame,\mu}n_f+n_{s,f}^{\mu}-L}{T_S}\right\rfloor_{mod\ Y} \mod Q$$

is the first parameter. For specific meanings of parameters such as Z and L, refer to the descriptions in the foregoing formula. Details are not described herein again.

The foregoing formula may further have another variation, for example, may be shown as a formula (15):

$$\lambda = \frac{2\pi}{Q}\left(\beta\left(\left(\left\lfloor\frac{N_{slot}^{frame,\mu}n_f+n_{s,f}^{\mu}-L}{T_S}\right\rfloor+B\right)R+(i'\ mod\ R)\right)_{mod\ Y} \mod Q\right) + \frac{2\pi}{Z}(\theta_2) \quad (15)$$

$$\beta\left(\left(\left\lfloor\frac{N_{slot}^{frame,\mu}n_f+n_{s,f}^{\mu}-L}{T_S}\right\rfloor+B\right)R+(i'\ mod\ R)\right)_{mod\ Y}$$

is the first cyclic shift interval, and $$\beta\left(\left(\left\lfloor\frac{N_{slot}^{frame,\mu}n_f+n_{s,f}^{\mu}-L}{T_S}\right\rfloor+B\right)R+(i'\ mod\ R)\right)_{mod\ Y} \mod Q$$

is the first parameter.

In this embodiment of this application, the first cyclic shift interval is determined from a first pattern based on information about a first time unit, and the first pattern includes Y cyclic shift intervals, for example, the first pattern is $[\beta_0, \beta_1, \beta_2, \ldots, \beta_{Y-1}]$, and Y is an integer greater than 1. Each cyclic shift interval included in the first pattern is an integer. The first pattern may be determined from X patterns, where X is a positive integer. The first time unit is a time unit for sending the reference signal.

For example, the first pattern may be determined from the X patterns based on first indication information. The first indication information may be sent by the network device to the terminal device.

In this embodiment of this application, the Y cyclic shift intervals included in the first pattern may be predefined integers. In a possible implementation, the X patterns may be predefined, X is a positive integer, and each of the X patterns includes Y cyclic shift intervals. The network device may send the first indication information to the terminal device, where the first indication information is for indicating one pattern in the X patterns, and the terminal device may determine the first pattern from the X patterns based on the first indication information.

How the X patterns are implemented is not limited in this embodiment of this application. For example, Y cyclic shift intervals included in an $x^{th}$ pattern in the predefined X patterns are:

$$[\tilde{\beta}_0^{(\lfloor x/Q \rfloor)(x \bmod Q)}, \tilde{\beta}_1^{(\lfloor x/Q \rfloor)(x \bmod Q)}, \ldots, \tilde{\beta}_{Y-1}^{(\lfloor x/Q \rfloor)(x \bmod Q)}].$$

When the second indication information indicates that the first pattern is the $x^{th}$ pattern in the X patterns, a $y^{th}$ cyclic shift interval of the first pattern is $\beta_y = \tilde{\beta}_y^{(\lfloor x/Q \rfloor)(x \bmod Q)}$, $y=0, 1, \ldots, Y-1$.

The X patterns may be any X patterns that meet the following conditions:

Condition 1: For all nonnegative integers i and j, $\tilde{\beta}_0^{(i)(j)}$ is any value in a set $\{0, 1, \ldots, Q-1\}$.

Condition 2: For $i \in \{0, 1, \ldots, \lfloor X/Q \rfloor\}$ and $y \in \{1, 2, \ldots, Y-1\}$, if $j_1 \neq j_2$, $b_y^{(i)(j_1)} \neq b_y^{(i)(j_2)}$, where $b_y^{(i)(j)} = (\tilde{\beta}_y^{(i)(j)} - \tilde{\beta}_{y-1}^{(i)(j)}) \bmod Z$.

Condition 3: For $i \in \{0, 1, \ldots, \lfloor X/Q \rfloor\}$, $j \in \{0, 1, \ldots, Q-1\}$, and $y \in \{1, 2, \ldots, Y-1\}$, $b_y^{(i)(j)} = b_y^{(i-1)(y-1+j) \bmod Q)}$.

Optionally, a value of $\tilde{\beta}_0^{(\lfloor x/Q \rfloor)(x \bmod Q)}$ and a value of $\{b_y^{(\lfloor x/Q \rfloor)(x \bmod Q)} | y \in \{1, \ldots, Y-1\}, x \in \{0, 1, \ldots, Q-1\}\}$ may be determined by the terminal device based on a predefined rule and/or the configuration information of the network device, where $\tilde{\beta}_0^{(\lfloor x/Q \rfloor)(x \bmod Q)}$ may be any value in the set $\{0, 1, \ldots, Q-1\}$, and values of $\tilde{\beta}_0^{(\lfloor x/Q \rfloor)(x \bmod Q)}$ that correspond to different x may be the same or different. This is not limited in this embodiment of this application. For example, $\{\tilde{\beta}_0^{(\lfloor x/Q \rfloor)(x \bmod Q)} = 0 | \forall x \in \{0, 1, \ldots, X-1\}\}$.

The value of $\{b_y^{(\lfloor x/Q \rfloor)(x \bmod Q)} | y \in \{1, \ldots, Y-1\}, x \in \{0, 1, \ldots, Q-1\}\}$ is an integer that meets condition 2 and belongs to the set $\{0, 1, \ldots, Q-1\}$. For example, $\{b_y^{(\lfloor x/Q \rfloor)(x \bmod Q)} = x \bmod Q | \forall y \in \{1, \ldots, Y-1\}, x \in \{0, 1, \ldots, Q-1\}\}$. The terminal device may determine a value of $\{b_y^{(\lfloor x/Q \rfloor)(x \bmod Q)} | y \in \{1, \ldots, Y-1\}, x \in \{Q, Q+1, \ldots, X-1\}\}$ based on the value of $\{b_y^{(\lfloor x/Q \rfloor)(x \bmod Q)} | y \in \{1, \ldots, Y-1\}, x \in \{0, 1, \ldots, Q-1\}\}$ and condition 3.

Further, the terminal device may determine a value of $\{\tilde{\beta}_y^{(\lfloor x/Q \rfloor)(x \bmod Q)} | x \in \{0, 1, \ldots, X-1\}, y \in \{0, 1, \ldots, Y-1\}\}$ based on the value of $\{\tilde{\beta}_0^{(\lfloor x/Q \rfloor)(x \bmod Q)} | x \in \{0, 1, \ldots, X-1\}\}$ and the value of $\{b_y^{(\lfloor x/Q \rfloor)(x \bmod Q)} | y \in \{1, \ldots, Y-1\}, x \in \{Q, Q+1, \ldots, X-1\}\}$. Specifically, a value of $\tilde{\beta}_y^{(\lfloor x/Q \rfloor)(x \bmod Q)}$ satisfies the following formula: $\tilde{\beta}_y^{(\lfloor x/Q \rfloor)(x \bmod Q)} = (\tilde{\beta}_0^{(\lfloor x/Q \rfloor)(x \bmod Q)} + \sum_{i=1}^{y} b_i^{(\lfloor x/Q \rfloor)(x \bmod Q)}) \bmod Q$.

For example, the X patterns may be: $\{\tilde{\beta}_y^{(\lfloor x/Q \rfloor)(x \bmod Q)} = (D + \sum_{i=1}^{y}((i-1)\lfloor x/Q \rfloor + x)) \bmod Q | y \in \{0, 1, \ldots, Y-1\}, x \in \{0, 1, \ldots, X-1\}\}$, where D may be any integer, for example, D=0.

In the foregoing method, the terminal devices that send reference signals on a same time-frequency resource may be classified into G groups based on the base sequences used to generate sequences of the reference signals, where G is a quantity of base sequences. Terminal devices belonging to a same group generate sequences of reference signals by using a same base sequence, and terminal devices belonging to different groups generate sequences of reference signals by using different base sequences. The network device may configure different cyclic shift hopping patterns, namely, different values of x, for the G groups of terminal devices. In other words, a same cyclic shift hopping pattern, namely, a same value of x, is configured for terminal devices that determine reference signals by using a same base sequence, and different cyclic shift patterns, namely, different values of x, are configured for terminal devices that determine reference signals by using different base sequences. When G is less than or equal to Q, differences between cyclic shifts of reference signals sent on any two adjacent same-frequency-domain resources by any two terminal devices that are in the G groups of terminal devices and that belong to different groups are different. In other words, interference between the reference signals of any two terminal devices that generate reference signal sequences based on different base sequences can be randomized, so that channel measurement accuracy can be improved. When G is greater than Q and less than $Q^2$, differences between cyclic shift of reference signals sent on any three adjacent same-frequency-domain resources by any two terminal devices that are in the G groups of terminal devices and that belong to different groups are different. In other words, when coherent bandwidth is greater than or equal to two times the sending periodicity of the reference signal, channel measurement accuracy can be improved through time-domain filtering.

Method 6: The first parameter is determined based on a first cyclic shift step and information about a first time unit, and the cyclic shift value $\alpha$ is determined based on $\lambda$. For example, $\alpha = \lambda$, where $\lambda$ satisfies the following formula:

$$\lambda = \frac{2\pi}{Q}\left(\left(\Delta \text{hopping} \times \left\lfloor \frac{N_{slot}^{frame,\mu} n_f + n_{s,f}^{\mu} - L}{T_S} \right\rfloor\right) \bmod Q\right) + \frac{2\pi}{Z}(\theta_2) \quad (16)$$

$\Delta$hopping is the first cyclic shift step; and $$\left(\Delta \text{hopping} \times \left\lfloor \frac{N_{slot}^{frame,\mu} n_f + n_{s,f}^{\mu} - L}{T_S} \right\rfloor\right) \bmod Q$$

is the first parameter. The first cyclic shift step is determined from Q cyclic shift steps. For specific meanings of parameters such as Q and L, refer to the descriptions in the foregoing formula. Details are not described herein again.

For example, the first cyclic shift step $\Delta$hopping may be a value in a preset set. For example, the preset set={0, 1, 2, ..., Q-1}.

For example, the network device may send second indication information to the terminal device, and the second indication information is for indicating the first cyclic shift step. Therefore, the terminal device may determine the first cyclic shift step based on the second indication information. For example, the network device preconfigures Q cyclic shift steps for the terminal device, and the second indication information is for indicating a cyclic shift step in the Q cyclic shift steps. For example, the second indication information may be an index value of the first cyclic shift step in the Q cyclic shift steps. The terminal device may determine the first cyclic shift step based on the second indication information.

In the foregoing method, terminal devices that send reference signals on a same time-frequency resource may be classified into G groups based on the base sequences for generating sequences of the reference signals, where G is a quantity of base sequences. Terminal devices belonging to a same group generate sequences of reference signals by using a same base sequence, and terminal devices belonging to different groups generate sequences of reference signals by using different base sequences. When G is less than or equal to Q, the network device may configure different values of $\Delta$hopping for the G groups of terminal devices. In other words, a same value of $\Delta$hopping is configured for terminal devices that determine reference signals by using a same base sequence, and different values of Δhopping are configured for terminal devices that determine reference signals by using different base sequences. In this manner, differences between cyclic shifts of reference signals sent on any two adjacent same-frequency-domain resources by any two terminal devices that are in the G groups of terminal devices and that belong to different groups may be different, so that interference between reference signals of any two terminal devices that generate reference signal sequences based on different base sequences can be randomized, and channel measurement accuracy can be improved.

Method 7: The first parameter is determined based on a first initial cyclic shift step, a first cyclic shift step gap, and information about a first time unit, where the first time unit may be an OFDM symbol, and the information about the first time unit includes a number of a system frame that the first time unit is in, and a slot number, in the current system frame, of a slot that the first time unit is in. The cyclic shift value α is determined based on λ. For example, α=λ, where λ satisfies the following formula:

$$\lambda = \frac{2\pi}{Q}\left(\left(\Delta h_{init} \times N_{T_S} + \Delta h_{gap} \times \frac{N_{T_S} \times (N_{T_S} - 1)}{2}\right) \bmod Q\right) + \frac{2\pi}{Z}(\sigma_2) \quad (17)$$

$$N_{T_S} = \left\lfloor \frac{N_{slot}^{frame,\mu} n_f + n_{s,f}^{\mu} - L}{T_S} \right\rfloor$$

$$\left(\Delta h_{init} \times N_{T_S} + \Delta h_{gap} \times \frac{N_{T_S} \times (N_{T_S} - 1)}{2}\right) \bmod Q$$

is the first parameter.

Alternatively, the first parameter is determined based on the first initial cyclic shift step, the first cyclic shift step gap, and the information about the first time unit, where the first time unit is an OFDM symbol, and the information about the first time unit includes the number of the system frame that the first time unit is in, the slot number, in the current system frame, of the slot that the first time unit is in, and a symbol number of the first time unit in the reference signal resource. The symbol number belongs to a set $\{0, 1, \ldots, N_{symb}^{SRS}-1\}$, $N_{symb}^{SRS}$ and is a quantity of consecutive OFDM symbols that are predefined or configured by the network device and that can be used to send the reference signal, and the cyclic shift value α is determined based on λ. For example, α=λ, where λ satisfies the following formula:

$$\lambda = \frac{2\pi}{Q}\left(\left(\Delta h_{init} \times N_{T_S} + \Delta h_{gap} \times \frac{N_{T_S} \times (N_{T_S} - 1)}{2}\right) \bmod Q\right) + \frac{2\pi}{Z}(\sigma_2) \quad (18)$$

$$N_{T_S} = \left(\left\lfloor \frac{N_{slot}^{frame,\mu} n_f + n_{s,f}^{\mu} - L}{T_S} \right\rfloor + B\right) R + (l' \bmod R)$$

For the meanings of parameters in the foregoing formula, refer to the foregoing descriptions. Details are not described herein again.

For example, the first initial cyclic shift step $\Delta h_{init}$ may be a value in a first preset set. For example, the first preset set=$\{0, 1, 2, \ldots, Q-1\}$. The first cyclic shift step gap $\Delta h_{gap}$ may be a value in a second preset set. For example, the second preset set=$\{0, 1, 2, \ldots, Q-1\}$.

In a possible implementation, the network device sends third indication information to the terminal device, and indicates the first initial cyclic shift step to the terminal device based on the third indication information. For example, the network device preconfigures Q initial cyclic shift steps, and the third indication information is for indicating an initial cyclic shift step in the Q initial cyclic shift steps. Therefore, the terminal device may determine the first initial cyclic shift step from the Q initial cyclic shift steps based on the third indication information.

Correspondingly, the network device may further send fourth indication information to the terminal device, and indicate the first cyclic shift step gap to the terminal device based on the fourth indication information. For example, the network device preconfigures Q first cyclic shift step gaps, and the fourth indication information is for indicating a first cyclic shift step gap in the Q first cyclic shift step gaps. Therefore, the terminal device may determine the first cyclic shift step gap from the Q first cyclic shift step gaps based on the fourth indication information.

It should be noted that in method 5 to method 7, when the cyclic shift value α is determined based on λ, there may be a plurality of implementations. For example, α=λ. For another example, α=λ/2. For another example, α=λ mod 2π. There may also be other implementations, which are not listed one by one herein.

According to the foregoing method, terminal devices that send reference signals on a same time-frequency resource may be classified into G groups based on base sequences for generating sequences of the reference signals, where G is a quantity of base sequences. Terminal devices belonging to a same group generate sequences of reference signals by using a same base sequence, and terminal devices belonging to different groups generate sequences of reference signals by using different base sequences. The network device may configure different initial cyclic shift steps and/or different cyclic shift step gaps for the G groups of terminal devices. In other words, a same initial cyclic shift step and a same cyclic shift step gap are configured for terminal devices that determine reference signals by using a same base sequence, and different initial cyclic shift steps and/or different cyclic shift step gaps are configured for terminal devices that determine reference signals by using different base sequences. When G is less than or equal to Q, the differences between cyclic shifts of reference signals sent on any two adjacent same-frequency-domain resources by any two terminal devices that are in the G groups of terminal devices and that belong to different groups are different. In other words, interference between reference signals of any two terminal devices that generate reference signal sequences based on different base sequences can be randomized, so that channel measurement accuracy can be improved. When G is greater than Q and less than $Q^2$, differences between cyclic shift of reference signals sent on any three adjacent same-frequency-domain resources by any two terminal devices that are in the G groups of terminal devices and that belong to different groups are different. In other words, when coherent bandwidth is greater than or equal to two times a sending periodicity of the reference signal, channel measurement accuracy can be improved through time-domain filtering.

It should be noted that, in some embodiments of this application, the first time unit may be a slot, an OFDM symbol, or a time unit such as a subframe or a system frame. It should be noted that the information about the first time unit includes at least one of the following: the number of the system frame that the first time unit is in, the slot number, in the current system frame, of the slot that the first time unit is in, or a symbol number, in the current slot, of a symbol that the first time unit is in. Specifically, the following several cases may be included:

Case 1: The first time unit is a subframe, and the information about the first time unit includes the number of the system frame that the first time unit is in.

Case 2: The first time unit is a slot, and the information about the first time unit includes the number of the system frame that the first time unit is in and/or the slot number of the first time unit (namely, a slot) in the current system frame.

Case 3: The first time unit is an OFDM symbol, and the information about the first time unit includes the number of the system frame that the first time unit is in, the slot number, in the current system frame, of the slot that the first time unit is in, and/or the symbol number of the first time unit (namely, a symbol) in the current slot.

It should be noted that in this embodiment of this application, when the first time unit is an OFDM symbol, case 4 may further be provided.

Case 4: The first time unit is an OFDM symbol, and the information about the first time unit includes the number of the system frame that the first time unit is in, and/or the slot number, in the current system frame, of the slot that the first time unit is in, and/or the symbol number of the first time unit (namely, a symbol) in the current slot, and/or the symbol number of the first time unit (namely, a symbol) in the current reference signal resource.

The foregoing is merely an example, and there may still be other cases, which are not listed one by one herein.

In the cyclic shift hopping manner in this application, the terminal device can use different cyclic shift values at different reference signal measurement moments, so that a cyclic shift difference between any two users who use different base sequences to generate reference signal sequences may vary at each reference signal measurement moment. That is, errors of channel estimation performed several adjacent times are different, so that interference between sequences of reference signals generated based on different base sequences is randomized, and channel estimation accuracy is improved.

In embodiments of this application, the sequence of the reference signal may be generated in another manner, so that interference between reference signals is randomized, and channel estimation accuracy is improved. Details are described below.

Figure 4:
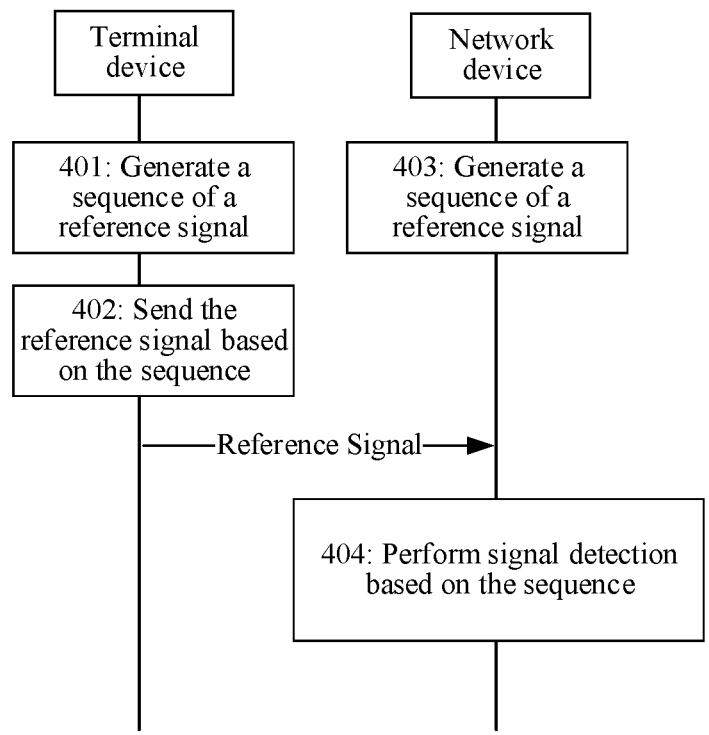
FIG. 4 is a schematic flowchart of a signal transmission method according to an embodiment of this application.

FIG. 4 is a schematic flowchart of a method according to an embodiment of this application. Refer to FIG. 4. The method includes the following steps.

Step 401: Generate a sequence of a reference signal, where at least two of a cyclic shift value, a sequence group number, and a sequence number of the sequence are determined based on a pseudo-random sequence.

Step 402: Send the reference signal based on the sequence.

The reference signal may be an uplink sounding reference signal (SRS), an uplink demodulation reference signal (DMRS), a phase tracking signal, or the like.

Step 401 and step 402 may be performed by a terminal device.

Step 403: Generate a sequence of a reference signal.

Step 404: Perform signal detection based on the sequence.

Step 403 and step 404 may be performed by a network device. A specific implementation in which the network device generates the sequence of the reference signal may be the same as the implementation in step 401. Details are not described herein again.

It should be noted that how the sequences of the reference signals are generated by the terminal device and the network device, and processes of generating the sequences of the reference signals are not limited in embodiments of this application. Details are not described herein again. Correspondingly, how the detection is specifically performed by the network device is not limited in this embodiment of this application. Details are not described herein again.

It should be noted that a specific form of the pseudo-random sequence is not limited in embodiments of this application. For example, for the specific form, refer to the pseudo-random sequence described in formula (13). The pseudo-random sequence may be determined based on attribute information of the reference signal or attribute information of the terminal device. Specifically, an initial seed parameter of the pseudo-random sequence may be determined based on the attribute information of the reference signal or the attribute information of the terminal device. For details, refer to the foregoing descriptions. Details are not described herein again.

In some embodiments of this application, when at least two of the cyclic shift value, the sequence group number, and the sequence number of the sequence of the reference signal are determined based on the pseudo-random sequence, the following scenarios may exist.

Scenario 1: The cyclic shift value, the sequence group number, and the sequence number are determined based on the pseudo-random sequence.

In this scenario, in a possible implementation, the cyclic shift value α may satisfy the foregoing formulas (1) and (2):

$$\alpha = \frac{2\pi \cdot t_1}{Q}(\theta_1) + \frac{2\pi \cdot t_2}{Z}(\theta_2), \text{ or } \alpha = \left(\frac{2\pi}{Q}(\theta_1) + \frac{2\pi}{Z}(\theta_2)\right) \bmod 2\pi.$$

$\theta_1$ is a first parameter and $\theta_2$ is a second parameter; and $t_1$ is a first coefficient, $t_2$ is a second coefficient, and neither the first coefficient nor the second coefficient is greater than 0. For specific values of Z and Q, refer to the foregoing descriptions. Details are not described herein again.

Specific implementations of the first parameter and the second parameter are not limited in this application. For example, the first parameter $\theta_1$ may satisfy the foregoing formula (4), formula (6), formula (9), and formula (11). The second parameter $\theta_2$ may satisfy the foregoing formula (3).

In this scenario, in another possible implementation, the cyclic shift value α may satisfy the following formula:

$$\alpha = \frac{2\pi}{Q}\left(\left(K + n_{cs}\left(n_{s,f}^{\mu}, l\right)\right) \bmod Q\right) \quad (19)$$

$$\alpha = \frac{2\pi}{Q}\left(\left(K + n_{cs}(n_S)\right) \bmod Q\right) \quad (20)$$

or $$\alpha = \frac{2\pi}{Q}\left(\left(K + n_{cs}\left(n_f, n_{s,f}^{\mu}, L, T_S\right)\right) \bmod Q\right) \quad (21)$$

or

-continued $$\alpha = \frac{2\pi}{Q}\left(\left(K + n_{cs}(n_f, n_{s,f}^\mu, l)\right) \bmod Q\right) \quad (22)$$

or $$n_{cs}(n_{s,f}^\mu, l) = \sum_{m=0}^{T-1} 2^m c\left(TN_{symb}^{slot} n_{s,f}^\mu + Tl + m\right);$$

$$n_{cs}(n_S) = \sum_{m=0}^{T-1} 2^m c(Tn_S + m);$$

$$n_{cs}(n_f, n_{s,f}^\mu, L, T_S) = \sum_{m=0}^{T-1} 2^m c\left(T\left\lfloor \frac{N_{slot}^{frame,\mu} n_f + n_{s,f}^\mu - L}{T_S}\right\rfloor + m\right);$$

and $$n_{cs}(n_f, n_{s,f}^\mu, L, T_S) = \sum_{m=0}^{T-1} 2^m c\left(TS\left(N_{slot}^{frame,\mu} n_f + n_{s,f}^\mu\right) + Tl + m\right),$$

and m=0, 1, 2 . . . , T–1.

For the meanings of parameters in the foregoing formula, refer to descriptions in the foregoing formulas. Details are not described herein again.

In this scenario, the sequence group number u may satisfy the following formula:

$$u = \left(f_{gh}(n_{s,f}^\mu, l) + A\right) \bmod W \quad (23)$$

or $u = \left(f_{gh}(n_f, n_{s,f}^\mu, l) + A\right) \bmod W \quad (24)$ $$f_{gh}(n_{s,f}^\mu, l) = \left(\sum_{m=0}^{T-1} 2^m c\left(TN_{symb}^{slot} n_{s,f}^\mu + Tl + m\right)\right) \bmod W,$$

and m=0, 1, 2, . . . , T–1.

$$f_{gh}(n_f, n_{s,f}^\mu, l) = \left(\sum_{m=0}^{T1} 2^m c\left(TS\left(N_{slot}^{frame,\mu} n_f + n_{s,f}^\mu\right) + Tl + m\right)\right) \bmod W,$$

and m=0, 1, 2 . . . , T–1.

W, A, and T are integers; values of W and A may be preset, or may be configured by the network device, or may be determined in another manner, for example, A may be a sequence identifier $n_{ID}$ of the reference signal, and W may be equal to 30; a value range of $n_{ID}$ may be {0, 1, . . . , 1023} or {0, 1, . . . , 65535}; and c(•) is the pseudo-random sequence.

In this scenario, the sequence number v satisfies the following formula:

$$v = \begin{cases} c\left(T\left(n_f N_{slot}^{frame,\mu} N_{sysmb}^{slot} + n_{s,f}^\mu N_{sysmb}^{slot} + l\right)\right) & Q \geq E \\ 0 & Q < E \end{cases} \quad (25)$$

or $v = \begin{cases} c\left(T\left(n_{s,f}^\mu N_{sysmb}^{slot} + l\right)\right) & Q \geq E \\ 0 & Q < E \end{cases} \quad (26)$ E and T are positive integers; a value of E may be preset, or may be determined in another manner, for example, E=6 $N_{sc}^{RB}$; $N_{sc}^{RB}$ is a quantity of subcarriers occupied by a resource block; and Q may be a quantity $M_{sc,b}^{SRS}$ of subcarriers occupied by the reference signal, for example, $Q = M_{sc,b}^{SRS}$.

Scenario 2: The cyclic shift value and the sequence group number are determined based on the pseudo-random sequence, but the sequence number is not determined based on the pseudo-random sequence.

In this scenario, the cyclic shift value may satisfy any one of the foregoing formula (1), formula (2), and formula (19) to formula (22). The sequence group number may satisfy the foregoing formula (23) or formula (24).

In this scenario, the sequence number v=0 or 1. A specific value thereof is determined based on a configuration of the network device, or is predefined in a protocol. For example, that v=0 is predefined in the protocol.

Scenario 3: The cyclic shift value and the sequence number are determined based on the pseudo-random sequence, but the sequence group number is not determined based on the pseudo-random sequence.

In this scenario, the cyclic shift value may satisfy any one of the foregoing formula (1), formula (2), and formula (19) to formula (22). The sequence number may satisfy the foregoing formula (25) or formula (26).

In this scenario, the sequence group number u=A mod W.

Scenario 4: The sequence group number and the sequence number are determined based on the pseudo-random sequence, but the cyclic shift value is not determined based on the pseudo-random sequence.

In this scenario, the sequence group number may satisfy the foregoing formula (23) or formula (24). The sequence number may satisfy the foregoing formula (25) or formula (26).

In this scenario, the cyclic shift value α may satisfy the following formula:

$$\alpha = \frac{2\pi}{Z}\left(\left(n^{CS} + \frac{n^{CS,max}(p - W_K)}{N_{ap}}\right) \bmod Z\right) \quad (27)$$

$n_{CS}$ is configured by using higher layer signaling. $n^{CS,max}$ is determined based on higher layer signaling configuration information.

For example, assuming that both the first coefficient and the second coefficient are equal to 1, A is equal to a sequence identifier $n_{ID}^{SRS}$ of an SRS, W is equal to 30, $W_K$ is equal to 1000, T is equal to 8, Z is equal to $n_{SRS}^{CS,max}$ and E is equal to $6N_{sc}^{RB}$, and formula (1), formula (4), formula (23), and formula (25) are used as examples, when the reference signal is an SRS and when the cyclic shift value, the sequence group number, and the sequence number of the sequence of the reference signal are determined based on the pseudo-random sequence, in an implementation, when the SRS is generate, a corresponding cyclic shift value, sequence group number, and sequence number may be obtained by replacing the corresponding formulas in the scenarios 1 to 4 with the following formulas.

When being determined based on the pseudo-random sequence, the cyclic shift value α is determined through following formula:

$$\alpha = \frac{2\pi}{Q}\left(\left(\sum_{m=0}^{7} c\left(8\left(n_f N_{slot}^{frame,\mu} N_{sysmb}^{slot} + n_{s,f}^\mu N_{sysmb}^{slot} + l\right) + m\right) \times 2^m\right) \bmod Q\right) + \frac{2\pi}{n_{SRS}^{CS,max}}\left(\left(n_{SRS}^{CS} + \frac{n_{SRS}^{CS,max}(p - 1000)}{N_{ap}^{SRS}}\right) \bmod n_{SRS}^{CS,max}\right)$$

When being determined based on the pseudo-random sequence, the sequence group number u may be determined through the following formula:

$$u = \left(\left(\sum_{m=0}^{7} 2^m c\left(8\left(n_f N_{slot}^{frame,\mu} N_{sysmb}^{slot} + n_{s,f}^{\mu} N_{sysmb}^{slot} + l\right) + m\right)\right) \mod 30 + n_{ID}^{SRS}\right)$$

mod 30.

When being determined based on the pseudo-random sequence, the sequence number v may be determined through the following formula:

$$v = \begin{cases} c\left(8\left(n_f N_{slot}^{frame,\mu} N_{sysmb}^{slot} + n_{s,f}^{\mu} N_{sysmb}^{slot} + l\right)\right) & Q \geq 6N_{sc}^{RB} \\ 0 & Q < 6N_{sc}^{RB} \end{cases}.$$

Alternatively, in another implementation, when the SRS is generated, a corresponding cyclic shift value, sequence group number, and sequence number may be obtained by replacing the corresponding formulas in the scenarios 1 to 4 with the following formulas.

When being determined based on the pseudo-random sequence, the cyclic shift value $\alpha$ is determined through following formula:

$$\alpha = \frac{2\pi}{Q}\left(\left(\sum_{m=0}^{7} c\left(8\left(n_{s,f}^{\mu} N_{sysmb}^{slot} + l\right) + m\right) \times 2^m\right) \mod Q\right) + \frac{2\pi}{n_{SRS}^{CS,max}}\left(\left(n_{SRS}^{CS} + \frac{n_{SRS}^{CS,max}(p-1000)}{N_{ap}^{SRS}}\right) \mod n_{SRS}^{CS,max}\right).$$

When being determined based on the pseudo-random sequence, the sequence group number u may be determined through the following formula:

$$u = \left(\left(\sum_{m=0}^{7} 2^m c\left(8\left(n_{s,f}^{\mu} N_{sysmb}^{slot} + l\right) + m\right)\right) \mod 30 + n_{ID}^{SRS}\right) \mod 30.$$

When being determined based on the pseudo-random sequence, the sequence number v may be determined through the following formula:

$$v = \begin{cases} c\left(8\left(n_{s,f}^{\mu} N_{sysmb}^{slot} + l\right)\right) & Q \geq 6N_{sc}^{RB} \\ 0 & Q < 6N_{sc}^{RB} \end{cases}.$$

According to the methods in embodiments of this application, at least two of the cyclic shift value, the sequence group number, and the sequence number of the sequence of the reference signal are determined based on the pseudo-random sequence. Therefore, the sequence of the reference signal can hop in time domain. In other words, at least two of the manners of SRS sequence group hopping, sequence hopping, and cyclic shift hopping are implemented, so that the interference between SRS sequences can be effectively randomized, and channel estimation accuracy can be improved. For example, one sequence group is selected from 30 sequence groups based on the pseudo-random sequence. One sequence is selected from two sequences in a sequence group based on the pseudo-random sequence. The cyclic shift value is determined based on the pseudo-random sequence. In this way, interference between reference signals can be effectively randomized, and channel estimation accuracy can be improved.

Further, in embodiments of this application, how to generate the sequence of the reference signal based on the cyclic shift value in FIG. 2 or how to generate the sequence of the reference signal based on the cyclic shift value, the sequence group number, and the sequence number in FIG. 3 is not limited in embodiments of this application.

For example, when the reference signal is an SRS, an SRS sequence $r_{u,v}(n)$ whose length is M may be generated based on a base sequence $\bar{r}_{u,v}(n)$ through the following formula:

$$r_{u,v}(n) = e^{j\alpha n} \bar{r}_{u,v}(n), 0 \leq n \leq M.$$

$$\bar{r}_{u,v}(n) = x_q(n \mod N_{ZC});$$

$$x_q(m) = e^{-j\frac{\pi qm(m+1)}{N_{ZC}}};$$

$$q = \lfloor \bar{q} + 1/2 \rfloor + v(-1)^{\lfloor 2\bar{q} \rfloor};$$

and $\bar{q} = N_{ZC}(u+1)/31$.

$N_{ZC}$ is a length of the base sequence $\bar{r}_{u,v}(n)$; $\alpha$ is the cyclic shift value; u is the sequence group number; v is a sequence number; and is an imaginary unit. The base sequence $\bar{r}_{u,v}(n)$ may be a sequence generated based on a ZC sequence, for example, is the ZC sequence or a sequence generated by performing a cyclic shift on the ZC sequence.

In the foregoing embodiments provided in this application, the methods provided in embodiments of this application are separately described from a perspective of interaction between devices. To implement functions in the methods provided in the foregoing embodiments of this application, the network device or the terminal device may include a hardware structure and/or a software module, and implement the foregoing functions by using the hardware structure, the software module, or a combination of the hardware structure and the software module. Whether a function in the foregoing functions is performed by using the hardware structure, the software module, or the combination of the hardware structure and the software module depends on specific applications and design constraints of the technical solutions.

In embodiments of this application, division into modules is an example, and is merely a logical function division. During actual implementation, another division manner may be used. In addition, functional modules in embodiments of this application may be integrated into one processor, or each of the modules may exist alone physically, or two or more modules are integrated into one module. The integrated module may be implemented in a form of hardware, or may be implemented in a form of a software function module.

Figure 5:
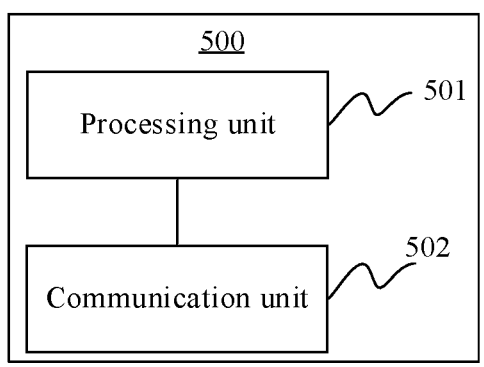
FIG. 5 is a schematic diagram of a structure of a communication apparatus according to an embodiment of this application.

Same as the foregoing concept, as shown in FIG. 5, an embodiment of this application further provides an apparatus 500, configured to implement a function of the network device or the terminal device in the foregoing methods. For example, the apparatus may be a software module or a chip system. In this embodiment of this application, the chip system may include a chip, or may include a chip and another discrete component. The apparatus 500 may include a processing unit 501 and a communication unit 502.

In embodiments of this application, the communication unit may also be referred to as a transceiver unit, and may include a sending unit and/or a receiving unit, which are respectively configured to perform sending and receiving steps of the network device or the terminal device in the foregoing method embodiments.

Figure 6:
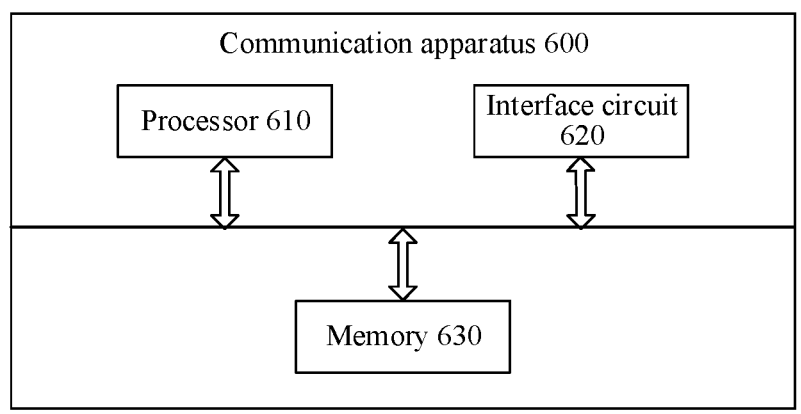
FIG. 6 is a schematic diagram of a structure of a communication apparatus according to an embodiment of this application.

The following describes in detail communication apparatuses provided in embodiments of this application with reference to FIG. 5 and FIG. 6. It should be understood that descriptions of apparatus embodiments correspond to the descriptions of method embodiments. Therefore, for content that is not described in detail, refer to the foregoing method embodiments. For brevity, details are not described herein again.

The communication unit may also be referred to as or refer to a transceiver, a transceiver machine, a transceiver apparatus, or the like. The processing unit may also be referred to as or refer to a processor, a processing board, a processing module, a processing apparatus, a processing circuit or processing circuits, or the like. Optionally, a component that is in the communication unit 502 and that is configured to implement a reception function may be considered as a receiving unit, and a component that is in the communication unit 502 and that is configured to implement a sending function may be considered as a sending unit. That is, the communication unit 502 includes the receiving unit and the sending unit. The communication unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmit circuit, or the like.

When the communication apparatus 500 performs a function of the terminal device in the procedure shown in FIG. 2 in the foregoing embodiment, the processing unit is configured to generate a sequence of a reference signal, where a cyclic shift value of the sequence is determined based on a first parameter and a second parameter, the first parameter is a value from 0 to Q−1, the second parameter is a value from 0 to Z−1, Z and Q are positive integers, and Z is not equal to Q; and the communication unit is configured to send the reference signal based on the sequence.

When the communication apparatus 500 performs a function of the network device in the procedure shown in FIG. 2 in the foregoing embodiment, the processing unit is configured to generate a sequence of a reference signal, where a cyclic shift value of the sequence is determined based on a first parameter and a second parameter, the first parameter is a value from 0 to Q−1, the second parameter is a value from 0 to Z−1, Z and Q are positive integers, and Z is not equal to Q; and the communication unit is configured to perform signal detection based on the sequence.

When the communication apparatus 500 performs a function of the terminal device in the procedure shown in FIG. 3 in the foregoing embodiment, the processing unit is configured to generate a sequence of a reference signal, where at least two of a cyclic shift value, a sequence group number, and a sequence number of the sequence are determined based on a pseudo-random sequence; and the communication unit is configured to send the reference signal based on the sequence.

When the communication apparatus 500 performs a function of the network device in the procedure shown in FIG. 3 in the foregoing embodiment, the processing unit is configured to generate a sequence of a reference signal, where at least two of a cyclic shift value, a sequence group number, and a sequence number of the sequence are determined based on a pseudo-random sequence; and the communication unit is configured to perform signal detection based on the sequence.

The foregoing is merely an example. The processing unit 501 and the communication unit 502 may further perform other functions. For more detailed descriptions, refer to related descriptions in the method embodiments shown in FIG. 2 and FIG. 3. Details are not described herein again.

FIG. 6 shows an apparatus 600 according to an embodiment of this application. The apparatus shown in FIG. 6 may be an implementation of a hardware circuit of the apparatus shown in FIG. 5. The communication apparatus may be applicable to the flowchart shown above and performs a function of the terminal device or the network device in the foregoing method embodiments. For ease of description, FIG. 6 shows only main components of the communication apparatus.

As shown in FIG. 6, the communication apparatus 600 includes a processor 610 and an interface circuit 620. The processor 610 and the interface circuit 620 are coupled to each other. It may be understood that the interface circuit 620 may be a transceiver or an input/output interface. Optionally, the communication apparatus 600 may further include a memory 630, configured to store instructions to be executed by the processor 610, input data necessary for running the instructions by the processor 610, or data generated after the processor 610 runs the instructions.

When the communication apparatus 600 is configured to implement the methods shown in FIG. 2 and FIG. 3, the processor 610 is configured to implement a function of the processing unit 501, and the interface circuit 620 is configured to implement a function of the communication unit 502.

When the communication apparatus is a chip used in the terminal device, the chip in the terminal device implements the function of the terminal device in the foregoing method embodiments. The chip in the terminal device receives information from another module (for example, a radio frequency module or an antenna) in the terminal device, where the information is sent by the network device to the terminal device. Alternatively, the chip in the terminal device sends information to another module (for example, a radio frequency module or an antenna) in the terminal device, where the information is sent by the terminal device to the network device.

When the communication apparatus is a chip used in the network device, the chip in the network device implements the function of the network device in the foregoing method embodiments. The chip in the network device receives information from another module (for example, a radio frequency module or an antenna) in the network device, where the information is sent by the terminal device to the network device. Alternatively, the chip in the network device sends information to another module (for example, a radio frequency module or an antenna) in the network device, where the information is sent by the network device to the terminal device.

It may be understood that, the processor in this embodiment of this application may be a central processing unit (CPU), or may be another general-purpose processor, a digital signal processor (DSP), an application-specific integrated circuit (ASIC), or the like.

The memory in this embodiment of this application may be any storage medium that is in another form and that is well known in the art, for example, a random access memory (RAM), a flash memory, a read-only memory (ROM), or a programmable read-only memory (PROM).

Embodiments described in this specification may be independent solutions, or may be combined based on internal logic. These solutions all fall within the protection scope of this application.

It may be understood that, in the foregoing method embodiments, the methods and the operations implemented by the terminal device may alternatively be implemented by a component (for example, a chip or a circuit) that can be used in the terminal device. The methods and the operations implemented by the network device may alternatively be implemented by a component (for example, a chip or a circuit) that can be used in the network device.

The foregoing mainly describes the solutions provided in this application from a perspective of interaction between network elements. It may be understood that, to implement the foregoing functions, each network element includes a corresponding hardware structure and/or software module for performing each function. A person skilled in the art should easily be aware that, in combination with the units and algorithm steps in the examples described in embodiments disclosed in this specification, the present invention may be implemented by hardware or a combination of hardware and computer software. Whether a function is performed by the hardware or by driving the hardware by computer software depends on specific applications and design constraints of the technical solutions. A person skilled in the art may use different methods to implement the described functions for each specific application, but it should not be considered that the implementation goes beyond the scope of the present invention.

Embodiments described in this specification may be independent solutions, or may be combined based on internal logic. These solutions all fall within the protection scope of this application.

It may be understood that, in the foregoing method embodiments, the methods and the operations implemented by the terminal device may alternatively be implemented by a component (for example, a chip or a circuit) that can be used in the terminal device. The methods and the operations implemented by the network device may alternatively be implemented by a component (for example, a chip or a circuit) that can be used in the network device.

The foregoing mainly describes the solutions provided in this application from a perspective of interaction between network elements. It may be understood that, to implement the foregoing functions, each network element includes a corresponding hardware structure and/or software module for performing each function. A person skilled in the art should easily be aware that, in combination with the units and algorithm steps in the examples described in embodiments disclosed in this specification, the present invention may be implemented by hardware or a combination of hardware and computer software. Whether a function is performed by the hardware or by driving the hardware by computer software depends on specific applications and design constraints of the technical solutions. A person skilled in the art may use different methods to implement the described functions for each specific application, but it should not be considered that the implementation goes beyond the scope of the present invention.

The invention claimed is:

1. A signal sending method, comprising:
generating a sequence of a reference signal, wherein a cyclic shift value of the sequence is determined based on a first parameter and a second parameter, the first parameter is a value from 0 to Q−1, the second parameter is a value from 0 to Z−1, Z and Q are positive integers, and Z is not equal to Q; and
sending the reference signal based on the sequence.

2. The method according to claim 1, wherein the cyclic shift value α satisfies the following formula:

$$\alpha = \frac{2\pi \cdot t_1}{Q}(\theta_1) + \frac{2\pi \cdot t_2}{Z}(\theta_2), \text{ or } \alpha = \left(\frac{2\pi}{Q}(\theta_1) + \frac{2\pi}{Z}(\theta_2)\right) \bmod 2\pi,$$

wherein
$\theta_1$ is the first parameter and $\theta_2$ is the second parameter; and $t_1$ is a first coefficient, $t_2$ is a second coefficient, and the first coefficient and the second coefficient are not equal to 0.

3. The method according to claim 1, wherein the first parameter $\theta_1$ satisfies the following formula:

$\theta_1 = n_{cs}(n_{s,f}^\mu, l) \bmod Q$, wherein $n_{cs}(n_{s,f}^\mu, l) = \Sigma_{m=0}^{T-1} 2^m c(T \cdot N_{symb}^{slot} n_{s,f}^\mu + Tl + m)$, and m=0, 1, 2, ..., T−1; $n_{s,f}^\mu$ is a slot number, in a system frame, of a slot that the reference signal is in; $N_{symb}^{slot}$ is a quantity of orthogonal frequency division multiplexing (OFDM) symbols in a slot; l is a symbol number, in the slot, of a symbol that the reference signal is in, $0 \leq l \leq N_{symb}^{slot}-1$, and that l=0 corresponds to a $1^{st}$ symbol in the slot; T is a positive integer; c(•) is the pseudo-random sequence; and mod is a modulo operation.

4. The method according to claim 1, wherein the first parameter $\theta_1$ satisfies the following formula:

$\theta_1 = n_{cs}(n_f, n_{s,f}^\mu, l) \bmod Q$, wherein $n_{cs}(n_f, n_{s,f}^\mu, l) = \Sigma_{m=0}^{T-1} 2^m c(TS(N_{slot}^{frame,\mu} n_f + n_{s,f}^\mu) + Tl + m)$, and m=0, 1, 2, ..., T−1; $n_{s,f}^\mu$ is a slot number, in a system frame, of a slot that the reference signal is in; $n_f$ is a number of the system frame that the reference signal is in; $N_{slot}^{frame,\mu}$ is a quantity of slots in a system frame; l is a symbol number, in the slot, of a symbol that the reference signal is in, $0 \leq l \leq N_{symb}^{slot}-1$, and that l=0 corresponds to a $1^{st}$ symbol in the slot; T is a positive integer; S is a positive integer; c(•) is the pseudo-random sequence; and mod is a modulo operation.

5. The method according to claim 1, wherein Q is a sequence length of the reference signal, or Q is a quantity of subcarriers occupied by the reference signal.

6. A signal detection method, comprising:
generating a sequence of a reference signal, wherein a cyclic shift value of the sequence is determined based on a first parameter and a second parameter, the first parameter is a value from 0 to Q−1, the second parameter is a value from 0 to Z−1, Z and Q are positive integers, and Z is not equal to Q; and
performing signal detection based on the sequence.

7. The method according to claim 6, wherein the cyclic shift value α satisfies the following formula:

$$\alpha = \frac{2\pi \cdot t_1}{Q}(\theta_1) + \frac{2\pi \cdot t_2}{Z}(\theta_2), \text{ or } \alpha = \left(\frac{2\pi}{Q}(\theta_1) + \frac{2\pi}{Z}(\theta_2)\right) \bmod 2\pi,$$

wherein
$\theta_1$ is the first parameter and $\theta_2$ is the second parameter; and $t_1$ is a first coefficient, $t_2$ is a second coefficient, and the first coefficient and the second coefficient are not equal to 0.

8. The method according to claim 6, wherein the first parameter $\theta_1$ satisfies the following formula:

$\theta_1 = n_{cs}(n_{s,f}^\mu, l) \bmod Q$, wherein $n_{cs}(n_{s,f}^\mu, l) = \Sigma_{m=0}^{T-1} 2^m c(T \cdot N_{symb}^{slot} n_{s,f}^\mu + Tl + m)$, and m=0, 1, 2, ..., T−1; $n_{s,f}^\mu$ is a slot number, in a system frame, of a slot that the reference signal is in; $N_{symb}^{slot}$ is a quantity of orthogonal frequency division multiplexing (OFDM) symbols in a slot; l is a symbol number, in the slot, of a symbol that the reference signal is in, $0 \leq l \leq N_{symb}^{slot} - 1$, and that l=0 corresponds to a $1^{st}$ symbol in the slot; T is a positive integer; c(•) is the pseudo-random sequence; and mod is a modulo operation.

9. The method according to claim 6, wherein the first parameter $\theta_1$ satisfies the following formula:

$\theta_1 = n_{cs}(n_f, n_{s,f}^\mu, l) \bmod Q$, wherein $n_{cs}(n_f, n_{s,f}^\mu, l) = \Sigma_{m=0}^{T-1} 2^m c(TS(N_{slot}^{frame,\mu} n_f + n_{s,f}^\mu) + Tl + m)$, and m=0, 1, 2, ..., T−1; $n_{s,f}^\mu$ is a slot number, in a system frame, of a slot that the reference signal is in; $n_f$ is a number of the system frame that the reference signal is in; $N_{slot}^{frame,\mu}$ is a quantity of slots in a system frame; l is a symbol number, in the slot, of a symbol that the reference signal is in, $0 \leq l \leq N_{symb}^{slot} - 1$, and that l=0 corresponds to a $1^{st}$ symbol in the slot; T is a positive integer; S is a positive integer; c(•) is the pseudo-random sequence; and mod is a modulo operation.

10. The method according to claim 6, wherein Q is a sequence length of the reference signal, or Q is a quantity of subcarriers occupied by the reference signal.

11. A communication apparatus, comprising:
a processing unit, configured to generate a sequence of a reference signal, wherein a cyclic shift value of the sequence is determined based on a first parameter and a second parameter, the first parameter is a value from 0 to Q−1, the second parameter is a value from 0 to Z−1, Z and Q are positive integers, and Z is not equal to Q; and
a communication unit, configured to send the reference signal based on the sequence.

12. The apparatus according to claim 11, wherein the cyclic shift value α satisfies the following formula:

$$\alpha = \frac{2\pi \cdot t_1}{Q}(\theta_1) + \frac{2\pi \cdot t_2}{Z}(\theta_2), \text{ or } \alpha = \left(\frac{2\pi}{Q}(\theta_1) + \frac{2\pi}{Z}(\theta_2)\right) \bmod 2\pi,$$

wherein
$\theta_1$ is the first parameter and $\theta_2$ is the second parameter; and $t_1$ is a first coefficient, $t_2$ is a second coefficient, and the first coefficient and the second coefficient are not 0.

13. The apparatus according to claim 11, wherein the first parameter $\theta_1$ satisfies the following formula:

$\theta_1 = n_{cs}(n_{s,f}^\mu, l) \bmod Q$, wherein $n_{cs}(n_{s,f}^\mu, l) = \Sigma_{m=0}^{T-1} 2^m c(T N_{symb}^{slot} n_{s,f}^\mu + Tl + m)$, and m=0, 1, 2, ..., T−1; $n_{s,f}^\mu$ is a slot number, in a system frame, of a slot that the reference signal is in; $N_{symb}^{slot}$ is a quantity of orthogonal frequency division multiplexing (OFDM) symbols in a slot; l is a symbol number, in the slot, of a symbol that the reference signal is in, $0 \leq l \leq N_{symb}^{slot} - 1$, and that l=0 corresponds to a $1^{st}$ symbol in the slot; T is a positive integer; c(•) is the pseudo-random sequence; and mod is a modulo operation.

14. The apparatus according to claim 11, wherein the first parameter $\theta_1$ satisfies the following formula:

$\theta_1 = n_{cs}(n_f, n_{s,f}^\mu, l) \bmod Q$, wherein $n_{cs}(n_f, n_{s,f}^\mu, l) = \Sigma_{m=0}^{T-1} 2^m c(TS(N_{slot}^{frame,\mu} n_f + n_{s,f}^\mu) + Tl + m)$, and m=0, 1, 2, ..., T−1; $n_{s,f}^\mu$ is a slot number, in a system frame, of a slot that the reference signal is in; $n_f$ is a number of the system frame that the reference signal is in; $N_{slot}^{frame,\mu}$ is a quantity of slots in a system frame; l is a symbol number, in the slot, of a symbol that the reference signal is in, $0 \leq l \leq N_{symb}^{slot} - 1$, and that l=0 corresponds to a $1^{st}$ symbol in the slot; T is a positive integer; S is a positive integer; c(•) is the pseudo-random sequence; and mod is a modulo operation.

15. The apparatus according to claim 11, wherein Q is a sequence length of the reference signal, or Q is a quantity of subcarriers occupied by the reference signal.

16. A communication apparatus, comprising:
a processing unit, configured to generate a sequence of a reference signal, wherein a cyclic shift value of the sequence is determined based on a first parameter and a second parameter, the first parameter is a value from 0 to Q−1, the second parameter is a value from 0 to Z−1, Z and Q are positive integers, and Z is not equal to Q; and
a communication unit, configured to perform signal detection based on the sequence.

17. The apparatus according to claim 16, wherein the cyclic shift value α satisfies the following formula:

$$\alpha = \frac{2\pi \cdot t_1}{Q}(\theta_1) + \frac{2\pi \cdot t_2}{Z}(\theta_2), \text{ or } \alpha = \left(\frac{2\pi}{Q}(\theta_1) + \frac{2\pi}{Z}(\theta_2)\right) \bmod 2\pi,$$

wherein
$\theta_1$ is the first parameter and $\theta_2$ is the second parameter; and $t_1$ is a first coefficient, $t_2$ is a second coefficient, and the first coefficient and the second coefficient are not equal to 0.

18. The apparatus according to claim 16, wherein the first parameter $\theta_1$ satisfies the following formula:

$\theta_1 = n_{cs}(n_{s,f}^\mu, l) \bmod Q$, wherein $n_{cs}(n_{s,f}^\mu, l) = \Sigma_{m=0}^{T-1} 2^m c(T N_{symb}^{slot} n_{s,f}^\mu + Tl + m)$, and m=0, 1, 2, ..., T−1; is a slot number, in a system frame, of a slot that the reference signal is in; $N_{symb}^{slot}$ is a quantity of orthogonal frequency division multiplexing (OFDM) symbols in a slot; l is a symbol number, in the slot, of a symbol that the reference signal is in, $0 \leq l \leq N_{symb}^{slot} - 1$, and that l=0 corresponds to a $1^{st}$ symbol in the slot; T is a positive integer; c(•) is the pseudo-random sequence; and mod is a modulo operation.

19. The apparatus according to claim 16, wherein the first parameter 01 satisfies the following formula:

$\theta_1 = n_{cs}(n_f, n_{s,f}^\mu, l) \bmod Q$, wherein $n_{cs}(n_f, n_{s,f}^\mu, l) = \Sigma_{m=0}^{T-1} 2^m c(TS(N_{slot}^{frame,\mu} n_f + n_{s,f}^\mu) + Tl + m)$, and m=0, 1, 2, ..., T−1; $n_{s,f}^\mu$ is a slot number, in a system frame, of a slot that the reference signal is in; $n_f$ is a number of the system frame that the reference signal is in; $N_{slot}^{frame,\mu}$ is a quantity of slots in a system frame; l is a symbol number, in the slot, of a symbol that the reference signal is in, $0 \leq l \leq N_{symb}^{slot} - 1$, and that l=0 corresponds to a $1^{st}$ symbol in the slot; T is a positive integer; S is a positive integer; c(•) is the pseudo-random sequence; and mod is a modulo operation.

20. The apparatus according to claim 16, wherein Q is a sequence length of the reference signal, or Q is a quantity of subcarriers occupied by the reference signal.

\* \* \* \* \*